US008189771B2

(12) United States Patent  
Ghouti et al.

(10) Patent No.: US 8,189,771 B2
(45) Date of Patent: May 29, 2012

(54) HASH FUNCTIONS WITH ELLIPTIC POLYNOMIAL HOPPING

(75) Inventors: Lahouari Ghouti, Dhahran (SA); Mohammad K. Ibrahim, Leicester (GB); Atef J. Al-Najjar, Dhahran (SA)

(73) Assignee: King Fahd University of Petroleum & Minerals, Dhahran (SA)

( * ) Notice: Subject to any disclaimer, the term of this patent is extended or adjusted under 35 U.S.C. 154(b) by 809 days.

(21) Appl. No.: 12/318,910

(22) Filed: Jan. 12, 2009

(65) Prior Publication Data

US 2010/0177890 A1   Jul. 15, 2010

(51) Int. Cl.  
    *H04L 29/06* (2006.01)
(52) U.S. Cl. ............ 380/28; 380/29; 708/100; 708/200; 708/490; 708/492; 713/168; 713/170; 713/181
(58) Field of Classification Search .................... 380/28, 380/29; 708/100, 200, 490, 492; 713/168, 713/170, 181  
See application file for complete search history.

(56) References Cited

U.S. PATENT DOCUMENTS

| 4,424,414 A | 1/1984 | Hellman et al. |
| 4,668,103 A | 5/1987 | Wilson |
| 4,995,082 A | 2/1991 | Schnorr |
| 5,010,573 A | 4/1991 | Musyck et al. |
| 5,054,066 A | 10/1991 | Riek et al. |
| 5,146,500 A | 9/1992 | Maurer |
| 5,150,411 A | 9/1992 | Maurer |
| 5,272,755 A | 12/1993 | Miyaji et al. |
| 5,892,829 A | 4/1999 | Aiello et al. |
| 6,816,594 B1 | 11/2004 | Okeya |
| 7,062,043 B1 * | 6/2006 | Solinas ........................... 380/30 |
| 7,853,012 B2 * | 12/2010 | Sarangarajan et al. ......... 380/28 |
| 2003/0072443 A1 | 4/2003 | Harley et al. |
| 2003/0123655 A1 * | 7/2003 | Lambert et al. ................. 380/28 |
| 2006/0098814 A1 | 5/2006 | Al-Khoraidly et al. |
| 2009/0094464 A1 * | 4/2009 | Futa et al. ...................... 713/189 |
| 2010/0166174 A1 * | 7/2010 | Ghouti et al. .................... 380/28 |
| 2010/0166175 A1 * | 7/2010 | Ghouti et al. .................... 380/28 |
| 2010/0169644 A1 * | 7/2010 | Ghouti et al. .................. 713/169 |
| 2010/0208884 A1 * | 8/2010 | Joye .............................. 380/28 |
| 2011/0200185 A1 * | 8/2011 | Ghouti et al. .................... 380/28 |
| 2011/0200187 A1 * | 8/2011 | Ghouti et al. .................... 380/43 |
| 2011/0274269 A1 * | 11/2011 | Icart .............................. 380/28 |

FOREIGN PATENT DOCUMENTS

| EP | 0874307 | 10/1998 |
| EP | 0892520 | 1/1999 |
| EP | 1215642 | 6/2002 |

* cited by examiner

*Primary Examiner* — Nathan Flynn  
*Assistant Examiner* — Sarah Su  
(74) *Attorney, Agent, or Firm* — Richard C. Litman

(57) ABSTRACT

The hash functions with elliptic polynomial hopping are based upon an elliptic polynomial discrete logarithm problem. Security using hash functions is dependent upon the implementation of a computationally hard problem, and the elliptic polynomial discrete logarithm problem provides enough relative difficulty in computation to ensure that the produced hash functions, as applied to message bit strings, are optimally secure. The hash functions are produced as functions of both the elliptic polynomial as well as the twist of the elliptic polynomial, particularly using a method of polynomial hopping.

8 Claims, No Drawings

HASH FUNCTIONS WITH ELLIPTIC POLYNOMIAL HOPPING

BACKGROUND OF THE INVENTION

1. Field of the Invention

The present invention relates to cryptographic systems and methods used for electronic communication of messages over a computer network, such as the Internet, and particularly to hash functions with elliptic polynomial hopping that provide greater security for electronic communications than conventional hash functions.

2. Description of the Related Art

Cryptographic hash functions have many applications in electronic communications over a computer network. Such hash functions are sometimes referred to as "cryptographic checksums." The cryptographic hash functions compresses a plaintext message of any length to a message digest (number) or hash value of fixed bit length. The hash value can then be encrypted with a secret key and sent with the plaintext or encrypted plaintext message. The receiver of the communication can apply the same hash function to the received message compute a hash value and apply the secret key to decrypt the received hash value. If the hash value computed for the received message is the same as the decrypted hash value, the genuineness and authenticity of the message are confirmed.

Since the hash value is much shorter and therefore quicker to encrypt than the complete plaintext message, hash functions are often used for digital signatures. Hash functions may also be used to encrypt messages, and are sometimes used for verification of passwords, e.g., in UNIX systems, and in various other cryptographic applications for electronic communications.

Hash functions should meet certain requirements to ensure security. It should be possible to compute the message digest or hash value quickly. Hash functions should be deterministic, i.e., the message m and hash function H should produce one and only one hash value $y=H(m)$. A hash function should be a one-way function, i.e., given a message m and a hash function H so that the hash value or message digest $y=H(m)$, it should be computationally infeasible to reconstruct the message m from the hash value y; indeed, given the hash value y, it should be computationally infeasible to find any message m' so that hash function H produces $y=H(m')$ (pre-image resistance). Further, it should be computationally infeasible to find two messages $m_1 \neq m_2$ so that hash function H produces $H(m_1)=H(m_2)$ (weakly collision-free or second preimage resistant). For some applications, it is also desirable that it be computationally infeasible to find any two messages so that $H(m_1)=H(m_2)$ (strongly collision-free).

The most commonly used hash functions include the MDx class, such as MD5, the SHA class, including SHA-1, and the RIPEMD function, e.g., the RIPEMD-160 hash function. Such hash functions rely upon sequential and iterated structures, block ciphers, or computationally hard problems involving integer factorization. Recently, however, concerns have been raised concerning the security of such hash functions, as successful attacks on either the overall hash function or the compression function, or collisions with the hash values, have been reported.

Thus, hash functions with elliptic polynomial hopping solving the aforementioned problems is desired.

SUMMARY OF THE INVENTION

The hash functions with elliptic polynomial hopping are based upon an elliptic polynomial discrete logarithm problem, which is computationally hard. The hash functions to be described in greater detail below use both an elliptic polynomial and its twist simultaneously in a single encryption method. It should be noted that this method remains valid even if the elliptic polynomial and its twist are not isomorphic with respect to one another.

The hash functions with elliptic polynomial hopping include the steps of: a sending and receiving correspondent agreeing upon:

a) a form of an elliptic polynomial equation by deciding on an underlying finite field F, a number of x-coordinates, and a set of monomials used;

b) a random number $k_0$, which is kept as a secret key for a hash function to be used;

c) a random number generator;

d) a random number $kp_0$ which is made public;

e) the generation of all or some of the coefficients $b_{1l}^{(0)}$, $b_{2lk}^{(0)} \in F$ of a first elliptic polynomial to be used for generating the hash of a first message block, denoted the 0-th block, from the shared secret key $kp_0$;

f) an initial base point $(x_{0,B}^{(0)}, x_{1,B}^{(0)}, \ldots, x_{nx,B}^{(0)}, y_B^{(0)}, \alpha_B)$ for the selected polynomial, which is made public; and g) a computed scalar multiplication of the 0-th block shared key $k_0$ with a base point $(x_{0,B}^{(0)}, x_{1,B}^{(0)}, \ldots, x_{nx,B}^{(0)}, y_B^{(0)}, \alpha_B)$ to obtain $(x_{0,kB}^{(0)}, x_{1,kB}^{(0)}, \ldots, x_{nx,kB}^{(0)}, y_{kB}^{(0)}, 1) = k(x_{0,B}^{(0)}, x_{1,B}^{(0)}, \ldots, x_{nx,B}^{(0)}, y_B^{(0)}, \alpha_B)$, which is made public.

The sending correspondent then performs the following steps:

h) embedding the 0-th block into an elliptic polynomial message point $(x_{0,m}^{(0)}, x_{1,m}^{(0)}, \ldots, x_{nx,m}^{(0)}, y_m^{(0)}, \alpha_m^{(0)})$;

i) the hash point of the 0-th data block $(x_{0,c}^{(0)}, x_{1,c}^{(0)}, \ldots, x_{nx,c}^{(0)}, y_c^{(0)}, \alpha_c^{(0)})$ is computed using $(x_{0,c}^{(0)}, x_{1,c}^{(0)}, \ldots, x_{nx,c}^{(0)}, y_c^{(0)}, \alpha_c^{(0)}) = (x_{0,m}^{(0)}, x_{1,m}^{(0)}, \ldots, x_{nx,m}^{(0)}, y_m^{(0)}, \alpha_m^{(0)}) + (x_{0,kB}^{(0)}, x_{1,kB}^{(0)}, \ldots, x_{nx,kB}^{(0)}, y_{kB}^{(0)}, 1)$, where $\alpha_c^{(0)} = \alpha_m^{(0)}$, and for $j=1, \ldots, u$ repeating the following steps j) to n):

j) using $kp_{j-1}$ and the random number generator to generate a new random number $kp_j$;

k) generating at least some of the coefficients $b_{1l}^{(j)}, b_{2lk}^{(j)} \in F$ of a j-th elliptic polynomial from the random number $kp_j$;

l) embedding a j-th block of the message bit string into a j-th elliptic polynomial message point $(x_{0,m}^{(j)}, x_{1,m}^{(j)}, \ldots, x_{nx,m}^{(j)}, y_m^{(j)}, \alpha_m^{(j)})$;

m) hopping the hash point $(x_{0,c}^{(j-1)}, x_{1,c}^{(j-1)}, \ldots, x_{nx,c}^{(j-1)}, y_c^{(j-1)}, \alpha_c^{(j-1)})$ to an equivalent hash point $(x'_{0,c}^{(j)}, x'_{1,c}^{(j)}, \ldots, x'_{nx,c}^{(j)}, y'_c^{(j)}, \alpha'_c^{(j)})$ that satisfies the j-th elliptic polynomial selected in step l);

n) computing the hash point of the j-th data block $(x_{0,c}^{(j)}, x_{1,c}^{(j)}, \ldots, x_{nx,c}^{(j)}, y_c^{(j)}, \alpha_c^{(j)})$ using the equation $(x_{0,c}^{(j)}, x_{1,c}^{(j)}, \ldots, x_{nx,c}^{(j)}, y_c^{(j)}, \alpha_c^{(j)}) = (x_{0,m}^{(j)}, x_{1,m}^{(j)}, \ldots, x_{nx,m}^{(j)}, y_m^{(j)}, \alpha_m^{(j)}) + (x'_{0,c}^{(j)}, x'_{1,c}^{(j)}, \ldots, x'_{nx,c}^{(j)}, y'_c^{(j)}, \alpha'_c^{(j)})$; and o) the appropriate bits of the x-coordinates, and a bit indicating the value of $\alpha_c^{(u)}$ of the cipher point $(x_{0,c}^{(u)}, x_{1,c}^{(u)}, \ldots, x_{nx,c}^{(u)}, y_c^{(u)}, \alpha_c^{(j)})$ are concatenated together to form the hash bit string and sent to the receiving correspondent.

The receiving correspondent then performs the following steps:

p) embedding the 0-th block of the received message bit string into an elliptic polynomial message point $(x_{0,rm}^{(0)}, x_{1,rm}^{(0)}, \ldots, x_{nx,m}^{(0)}, y_{rm}^{(0)}, \alpha_{rm}^{(0)})$;

q) computing the hash point of the 0-th received data block $(x_{0,rc}^{(0)}, x_{1,rc}^{(0)}, \ldots, x_{nx,rc}^{(0)}, y_{rc}^{(0)}, \alpha_{rc}^{(0)})$ using $(x_{0,rc}^{(0)}, x_{1,rc}^{(0)}, \ldots, x_{nx,rc}^{(0)}, y_{rc}^{(0)}, \alpha_{rc}^{(0)}) = (x_{0,rm}^{(0)}, x_{1,rm}^{(0)}, \ldots, x_{nx,rm}^{(0)}, y_{rm}^{(0)}, \alpha_{rm}^{(0)}) + (x_{0,kB}^{(0)},$ $x_{1,kB}^{(0)}, \ldots, x_{nx,kB}^{(0)}, y_{kB}^{(0)}, 1)$, where $\alpha_{rc}^{(0)} = \alpha_{rm}^{(0)}$, and for $j = 1, \ldots, u$ repeat the following steps r) to w):

r) generating a new random number $kp_j$ using $kp_{j-1}$ and the random number generator;

s) generating at least some of the coefficients $b_{1l}^{(j)}, b_{2lk}^{(j)} \in F$ of the j-th elliptic polynomial from the random number $kp_j$;

t) embedding the j-th block of the received message bit string into a j-th elliptic polynomial message point $(x_{0,rm}^{(j)}, x_{1,rm}^{(j)}, \ldots, x_{nx,rm}^{(j)}, y_{rm}^{(j)}, \alpha_{rm}^{(j)})$;

u) hopping the hash point $(u_{0,rc}^{(j-1)}, x_{1,rc}^{(j-1)}, \ldots, x_{nxr,c}^{(j-1)}, y_{rc}^{(j-1)}, \alpha_{rc}^{(j-1)})$ to an equivalent hash point $(x'_{0,rc}^{(j)}, x_{1,rc}^{(j)}, \ldots, x'_{nx,rc}^{(j)}, y'_{rc}^{(j)}, \alpha'_{rc}^{(j)})$ that satisfies the j-th elliptic polynomial selected in step l);

v) computing the hash point of the j-th received data block $(x_{0,rc}^{(j)}, x_{1,rc}^{(j)}, \ldots, x_{nx,rc}^{(j)}, y_{rc}^{(j)}, \alpha_{rc}^{(j)})$ using $(x_{0,rc}^{(j)}, x_{1,rc}^{(j)}, \ldots, x_{nx,rc}^{(j)}, y_{rc}^{(j)}, \alpha_{rc}^{(j)}) = (x_{0,rm}^{(j)}, x_{1,rm}^{(j)}, \ldots, x_{nx,rm}^{(j)}, y_{rm}^{(j)}, \alpha_{rm}^{(j)}) + (x'_{0,rc}^{(j)}, x'_{1,rc}^{(j)}, \ldots, x'_{nx,rc}^{(j)}, y'_{rc}^{(j)}, \alpha'_{rc}^{(j)})$;

w) the appropriate bits of the x-coordinates and a bit indicating the value of $\alpha_c^{(u)}$ of the hash point $(x_{0,rc}^{(u)}, x_{1,rc}^{(u)}, \ldots, x_{nx,rc}^{(u)}, y_{rc}^{(u)}, \alpha_{rc}^{(j)})$ are concatenated together to form the hash bit string of the received message data, where if the hash bit string of the received massage data is the same as the hash bit string sent by the sending correspondent then the message hash is accepted as accurate, and if the hash bit string of the received massage data is not the same as the hash bit string sent by the sending correspondent then the message hash is determined to not be accurate.

These and other features of the present invention will become readily apparent upon further review of the following specification and drawings.

DETAILED DESCRIPTION OF THE PREFERRED EMBODIMENTS

The present invention is directed towards hash functions with elliptic polynomial hopping. Elliptic polynomials are based on the elliptic polynomial discrete logarithm problem, which is a computationally hard problem. The hash functions rely upon a particular subset of elliptic polynomials, as described below.

The hash functions to be described below use elliptic polynomial hopping in their generation, where different elliptic polynomials are used for different blocks of the same plaintext. Particularly, the hash functions use an elliptic polynomial with more than one independent x-coordinate. More specifically, a set of elliptic polynomial points are used which satisfy an elliptic polynomial equation with more than one independent x-coordinate which is defined over a finite field F having the following properties: One of the variables (the y-coordinate) has a maximum degree of two, and appears on its own in only one of the monomials; the other variables (the x-coordinates) have a maximum degree of three, and each must appear in at least one of the monomials with a degree of three; and all monomials which contain x-coordinates must have a total degree of three.

The group of points of the elliptic polynomial with the above form are defined over additions in the extended dimensional space and, as will be described in detail below, the inventive method makes use of elliptic polynomial hopping where different elliptic polynomials are used for different blocks of the same plaintext.

The particular advantage of using elliptic polynomial cryptography with more than one x-coordinate is that additional x-coordinates are used to embed extra message data bits in a single elliptic point that satisfies the elliptic polynomial equation. Given that nx additional x-coordinates are used, with nx being greater than or equal to one, a resulting elliptic point has (nx+1) x-coordinates, where all coordinates are elements of the finite field F. The number of points which satisfy an elliptic polynomial equation with nx additional x-coordinates defined over F and which can be used in the corresponding cryptosystem is increased by a factor of $(\#F)^{nx}$, where $\#$ denotes the size of a field.

Through the use of this particular method, security is increased through the usage of different elliptic polynomials for different message blocks during the generation of a message hash. Further, each elliptic polynomial used for each message block is selected at random, preferably using an initial value and a random number generator.

Given the form of the elliptic polynomial equation described above, the elliptic polynomial and its twist are isomorphic with respect to one another. The inventive method uses an embedding technique, to be described in greater detail below, which allows the embedding of a bit string into the x-coordinates of an elliptic polynomial point in a deterministic and non-iterative manner when the elliptic polynomial has the above described form. This embedding method overcomes the disadvantage of the time overhead of the iterative embedding methods used in existing elliptic polynomial.

The difficulty of using conventional elliptic polynomial cryptography to develop hash functions typically lies in the iterative and non-deterministic method needed to embed a bit string into an elliptic polynomial point, which has the drawback of the number of iterations needed being different for different bit strings which are being embedded. As a consequence, different hash times are required for different blocks of bit strings. Such a data-dependant generation time is not suitable for generating hash functions, which require data independent encryption time. Further, with regard to iterative and non-deterministic methods in conventional elliptic polynomial cryptography, given an elliptic polynomial defined over a finite field that needs N-bits for the representation of its elements, only $((nx+ny+1)N-L)$ bits of the message data bits can be embedded in any elliptic polynomial point.

The isomorphic relationship between an elliptic polynomial and its twist, which is obtained as a result of the given form of the elliptic polynomial equation, ensures that any bit string whose equivalent binary value is an element of the underlying finite field has a bijective relationship between the bit string and a point which is either on the elliptic polynomial or its twist. This bijective relationship allows for the development of the elliptic polynomial hopping based hash functions to be described below.

In the conventional approach to elliptic polynomial cryptography, the security of the resulting cryptosystem relies on breaking the elliptic polynomial discrete logarithm problem, which can be summarized as: given the points $k(x_{0,B}, x_{1,B}, \ldots, x_{nx,B}, y_B)$ and $(x_{0,B}, x_{1,B}, \ldots, x_{nx,B}, y_B)$, find the scalar k.

As will be described below, different elliptic polynomials are used for each block of the message data, where each elliptic polynomial used for each message block is selected at random using an initial value and a random number generator. Since the elliptic polynomial used for each message block is not known, this makes the elliptic polynomial discrete logarithm problem far more difficult to solve, since the attacker does not know the elliptic polynomial coefficients that are needed in order to compute point additions and point doublings.

Further, projective coordinates are used at the sending and receiving entities in order to eliminate inversion or division during each point addition and doubling operation of the scalar multiplication. It should be noted that all of the elliptic polynomial cryptography-based hash functions disclosed herein are scalable.

In the following, with regard to elliptic polynomials, the "degree" of a variable $u^i$ is simply the exponent i. A polynomial is defined as the sum of several terms, which are herein referred to as "monomials", and the total degree of a monomial $u^i v^j w^k$ is given by $(i+j+k)$. Further, in the following, the symbol $\in$ denotes set membership.

One form of the subject elliptic polynomial equation with more than one x-coordinate and one or more y-coordinates is defined as follows: the elliptic polynomial is a polynomial with more than two independent variables such that the maximum total degree of any monomial in the polynomial is three; at least two or more of the variables, termed the x-coordinates, have a maximum degree of three, and each must appear in at least one of the monomials with a degree of three; and at least one or more variables, termed the y-coordinates, have a maximum degree of two, and each must appear in at least one of the monomials with a degree of two.

Letting $S_{nx}$ represents the set of numbers from 0 to nx (i.e., $S_{nx}=\{0,\ldots,nx\}$), and letting $S_{ny}$ represents the set of numbers from 0 to ny (i.e., $S_{ny}=\{0,\ldots,ny\}$), and further setting $(nx+ny)\geq 1$, then, given a finite field, F, the following equation defined over F is one example of the polynomial described above:

$$\sum_{k \in S_{ny}} a_{1k} y_k^2 + \sum_{k,l \in S_{ny}, l \neq k} a_{2kl} y_k y_l + \sum_{k \in S_{ny}} a_{3k} y_k + \sum_{k,l \in S_{ny}, i \in S_{nx}} c_{1kli} y_k y_l x_i + \quad (1)$$
$$\sum_{k \in S_{ny}, l \in S_{nx}} c_{2kl} y_k x_l + \sum_{k \in S_{ny}, l,i \in S_{nx}} c_{3kli} y_k x_l x_i =$$
$$\sum_{l \in S_{nx}} b_{1l} x_l^3 + \sum_{l,k \in S_{nx}, l \neq k} b_{2lk} x_l^2 x_k + \sum_{l,k \in S_{nx}} b_{3lk} x_l x_k + \sum_{k \in S_{nx}} b_{4k} x_k + b_c,$$

where $a_{1l}, a_{2kl}, a_{3k}, c_{1lki}, c_{2kl}, c_{3kli}, b_{1l}, b_{2lk}, b_{3lk}, b_{4k}$ & $b_c \in F$.

Two possible examples of equation (1) are $y_0^2=x_0^3+x_1^3+x_0x_1$ and $y_0^2+x_0x_1y_0+y_0=x_0^3+x_1^3+x_0^2x_1+x_0x_1^2+x_0x_1+x_1$.

With regard to the use of the elliptic polynomial equation in the addition of points of an elliptic polynomial with more than one x-coordinate and one or more y-coordinates, we may examine specific coefficients $a_{1k}, a_{2kl}, a_{3k}, c_{1lki}, c_{2kl}, c_{3kli}, b_{1l}, b_{2lk}, b_{3lk}, b_{4k}$ & $b_c \in F$ for F, wherein a set of points $EC^{nx+ny+2}$ is defined as the (nx+ny+2)-tuple $(x_0,x_1,\ldots,x_{nx},y_0,y_1,\ldots,y_{ny})$, where $x_i,y_k \in F$, $i \in S_{nx}$ and $k \in S_{ny}$. This set of points are solutions of F, though excluding the point $(0, 0, \ldots, 0)$ and the point at infinity, $(x_{0,1},x_{1,1},\ldots,x_{nx,1},y_{0,1},y_{1,1},\ldots,y_{ny,1})$.

The rules for conventional elliptic polynomial point addition may be adopted to define an additive binary operation, "+", over $EC^{nx+ny+2}$, i.e., for all $(x_{0,1},x_{1,1},\ldots,x_{nx,1},y_{0,1},y_{1,1},\ldots,y_{ny,1}) \in EC^{nx+ny+2}$ and $(x_{0,2},x_{1,2},\ldots,x_{nx,2},y_{0,2},y_{1,2},\ldots,y_{ny,2}) \in EC^{nx+ny+2}$, the sum:

$(x_{0,3},x_{1,3},\ldots,x_{nx,3},y_{0,3},y_{1,3},\ldots,y_{ny,3})=(x_{0,1},x_{1,1},\ldots,x_{nx,1},y_{0,1},y_{1,1},\ldots,y_{ny,1})+(x_{0,2},x_{1,2},\ldots,x_{nx,2},y_{0,2},y_{1,2},\ldots,y_{ny,2})$ is also $(x_{0,3},x_{1,3},\ldots,x_{nx,3},y_{0,3},y_{1,3},\ldots,y_{ny,3}) \in EC^{nx+ny+2}$.

As will be described in greater detail below, $(EC^{nx+ny+2}, +)$ forms a pseudo-group (p-group) over addition that satisfies the following axioms:

(i) There exists a set $(x_{0,1},x_{1,1},\ldots,x_{nx,1},y_{0,1},y_{1,1},\ldots,y_{ny,1}) \in EC^{nx+ny+2}$ such that $(x_0,x_1,\ldots,x_{nx},y_0,y_1,\ldots,y_{ny})+(x_{0,1},x_{1,1},\ldots,x_{nx,1},y_{0,1},y_{1,1},\ldots,y_{ny,1})=(x_0,x_1,\ldots,x_{nx},y_0,y_1,\ldots,y_{ny})$ for all $(x_0,x_1,\ldots,x_{nx},y_0,y_1,\ldots,y_{ny}) \in EC^{nx+ny+2}$;

(ii) for every set $(x_0,x_1,\ldots,x_{nx},y_0,y_1,\ldots,y_{ny}) \in EC^{nx+ny+2}$, there exists an inverse set, $-(x_0,x_1,\ldots,x_{nx},y_0,y_1,\ldots,y_{ny}) \in EC^{nx+ny+2}$, such that $(x_0,x_1,\ldots,x_{nx},y_0,y_1,\ldots,y_{ny})-(x_0,x_1,\ldots,x_{nx},y_0,y_1,\ldots,y_{ny})=(x_{0,1},x_{1,1},\ldots,x_{nx,1},y_{0,1},y_{1,1},\ldots,y_{ny,1})$;

(iii) the additive binary operation in $(EC^{nx+ny+2}, +)$ is commutative, and the p-group $(EC^{nx+ny+2}, +)$ forms a group over addition when:

(iv) the additive binary operation in $(EC^{nx+ny+2}, +)$ is associative.

Prior to a more detailed analysis of the above axioms, the concept of point equivalence must be further developed. Mappings can be used to indicate that an elliptic point represented using (nx+1) x-coordinates and (ny+1) y-coordinates, $(x_0,x_1,\ldots,x_{nx},y_0,y_1,\ldots,y_{ny})$, is equivalent to one or more elliptic points that satisfy the same elliptic polynomial equation, including the equivalence of an elliptic point to itself.

Points that are equivalent to one another can be substituted for each other at random, or according to certain rules during point addition and/or point doubling operations. For example, the addition of two points $(x_{0,1},x_{1,1},\ldots,x_{nx,1},y_{0,1},y_{1,1},\ldots,y_{ny,1})$ and $(x_{0,2},x_{1,2},\ldots,x_{nx,2},y_{0,2},y_{1,2},\ldots,y_{ny,2})$ is given by:

$(x_{0,3},x_{1,3},\ldots,x_{nx,3},y_{0,3},y_{1,3},\ldots,y_{ny,3})=(x_{0,1},x_{1,1},\ldots,x_{nx,1},y_{0,1},y_{1,1},\ldots,y_{ny,1})+(x_{0,2},x_{1,2},\ldots,x_{nx,2},y_{0,2},y_{1,2},\ldots,y_{ny,2})$ If the point $(x''_{0,1},x''_{1,1},\ldots,x''_{nx,1},y''_{0,1},y''_{1,1},\ldots,y''_{ny,1})$ is equivalent to the point $(x_{0,1},x_{1,1},\ldots,x_{nx,1},y_{0,1},y_{1,1},\ldots,y_{ny,1})$, then the former can be substituted for $(x_{0,1},x_{1,1},\ldots,x_{nx,1},y_{0,1},y_{1,1},\ldots,y_{ny,1})$ in the above equation in order to obtain:

$(x_{0,3},x_{1,3},\ldots,x_{nx,3},y_{0,3},y_{1,3},\ldots,y_{ny,3})=(x''_{0,1},x''_{1,1},\ldots,x''_{nx,1},y''_{0,1},y''_{1,1},\ldots,y''_{ny,1})+(x_{0,2},x_{1,2},\ldots,x_{nx,2},y_{0,2},y_{1,2},\ldots,y_{ny,2})$ Mappings that are used to define equivalences can be based on certain properties that exist in elliptic polynomial equations, such as symmetry between variables. As an example, we consider the point $(x_0,x_1,y_0)$ that satisfies the equation $y_0^2=x_0^3+x_1^3+x_0x_1$. The equivalent of this point may be defined as $(x_1, x_0, -y_0)$.

With regard to the addition rules for $(EC^{nx+ny+2}, +)$, the addition operation of two points $(x_{0,1},x_{1,1},\ldots,x_{nx,1},y_{0,1},y_{1,1},\ldots,y_{ny,1}) \in EC^{nx+ny+2}$ and $(x_{0,2},x_{1,2},\ldots,x_{nx,2},y_{0,2},y_{1,2},\ldots,y_{ny,2}) \in EC^{nx+ny+2}$, otherwise expressed as:

$(x_{0,3},x_{1,3},\ldots,x_{nx,3},y_{0,3},y_{1,3},\ldots,y_{ny,3})=(x_{0,1},x_{1,1},\ldots,x_{nx,1},y_{0,1},y_{1,1},\ldots,y_{ny,1})+(x_{0,2},x_{1,2},\ldots,x_{nx,2},y_{0,2},y_{1,2},\ldots,y_{ny,2})$ is calculated in the following manner. First, a straight line is drawn which passes through the two points to be added. The straight line intersects $EC^{nx+ny+2}$ at a third point, which we denote $(x'_{0,3},x'_{1,3},\ldots,x'_{nx,3},y'_{0,3},y'_{1,3},\ldots,y'_{ny,3}) \in EC^{nx+ny+2}$. The sum point is defined as $(x_{0,3},x_{1,3},\ldots,x_{nx,3},y_{0,3},y_{1,3},\ldots,y_{ny,3})=-(x'_{0,3},x'_{1,3},\ldots,x'_{nx,3},y'_{0,3},y'_{1,3},\ldots,y'_{ny,3})$.

From the above definition of the addition rule, addition over $EC^{nx+ny+2}$ is commutative, that is:

$(x_{0,1},x_{1,1},\ldots,x_{nx,1},y_{0,1},y_{1,1},\ldots,y_{ny,1})+(x_{0,2},x_{1,2},\ldots,x_{nx,2},y_{0,2},y_{1,2},\ldots,y_{ny,2})=(x_{0,2},x_{1,2},\ldots,x_{nx,2},y_{0,2},y_{1,2},\ldots,y_{ny,2})+(x_{0,1},x_{1,1},\ldots,x_{nx,1},y_{0,1},y_{1,1},\ldots,y_{ny,1})$ for all $(x_{0,1},x_{1,1},\ldots,x_{nx,1},y_{0,1},y_{1,1},\ldots,y_{ny,1}) \in EC^{nx+ny+2}$ and for all $(x_{0,2},x_{1,2},\ldots,x_{nx,2},y_{0,2},y_{1,2},\ldots,y_{ny,2}) \in EC^{nx+ny+2}$. This commutivity satisfies axiom (iii) above.

There are two primary cases that need to be considered for the computation of point addition for $(EC^{nx+ny+2}, +)$: (A) for at least one $j \in S_{nx}$, $x_{j,1} \neq x_{j,2}$; and (B) for all $j \in S_{nx}$, $x_{j,1} = x_{j,2} = x_{j,o}$. Case B includes three sub-cases:

i. for all $k \in S_{ny}$ $y_{k,1} = y_{k,2}$, that is:

$$(x_{0,1}, x_{1,1}, \ldots, x_{nx,1}, y_{0,1}, y_{1,1}, \ldots, y_{ny,1}) = (x_{0,2}, x_{1,2}, \ldots, x_{nx,2}, y_{0,2}, y_{1,2}, \ldots, y_{ny,2})$$

which corresponds to point doubling;

ii. for $k \in S_{ny}$ & $k \neq 0$, $y_{k,1} \neq y_{k,2}$, and where $y_{0,1}$ & $y_{0,2}$ are the roots of the following quadratic equation in $y_0$:

$$a_{10}y_0^2 + \sum_{k \in S_{ny}, k \neq 0} a_{1k}y_{k,1}^2 + y_0\Big\{\sum_{k \in S_{ny}, k \neq 0} a_{2k0}y_{k,1} + \sum_{l \in S_{ny}, l \neq 0} a_{20l}y_{l,1}\Big\} +$$
$$\sum_{k,l \in S_{ny}, l \neq k, i \& k \neq 0} a_{2kl}y_{k,1}y_{l,1} + a_{30}y_0 + \sum_{k \in S_{ny}, k \neq 0} a_{3k}y_{k,1} +$$
$$y_0^2 \sum_{i \in S_{nx}} c_{100i}x_{i,1} + y_0\Big\{\sum_{k \in S_{ny}, i \in S_{nx}} c_{1k0i}y_{k,1}x_{i,1} + \sum_{l \in S_{ny}, i \in S_{nx}} c_{10li}y_{l,1}x_{i,1}\Big\} +$$
$$\sum_{k,l \in S_{ny}, l \& k \neq 0, i \in S_{nx}} c_{1kli}y_{k,1}y_{l,1}x_{i,1} +$$
$$y_0 \sum_{l \in S_{nx}} c_{20l}x_{l,1} + \sum_{k \in S_{ny}, k \neq 0, l \in S_{nx}} C_{2kl}y_{k,1}x_{l,1} +$$
$$y_0 \sum_{l,i \in S_{nx}} c_{30li}x_{l,1}x_{i,1} + \sum_{k \in S_{ny}, k \neq 0, l,i \in S_{nx}} c_{3kli}y_{k,1}x_{l,1}x_{i,1} =$$
$$\sum_{l \in S_{nx}} b_{1l}x_{l,1}^3 + \sum_{l,k \in S_{nx}, l \neq k} b_{2lk}x_{l,1}^2 x_{k,1} + \sum_{l,k \in S_{nx}} b_{3lk}x_{l,1}x_{k,1} + \sum_{k \in S_{nx}} b_{4k}x_{k,1} + b_c,$$

which corresponds to point inverse; and iii. all other conditions except those in Cases B.i and B.ii. This case occurs only when ny is greater than or equal to one.

For Case A, for at least one $j \in S_{nx}$ $x_{j,1} \neq x_{j,2}$, a straight line in $(nx+ny+2)$-dimensional space is defined by $$\frac{y_k - y_{k,1}}{y_{k,2} - y_{k,1}} = \frac{x_j - x_{j,1}}{x_{j,2} - x_{j,1}},$$

$k \in S_{ny}$ and $j \in S_{nx}$ and $$\frac{x_i - x_{i,1}}{x_{i,2} - x_{i,1}} = \frac{x_j - x_{j,1}}{x_{j,2} - x_{j,1}},$$

$i \neq j, i \in S_{nx}$.

For this case, $y_k = m_{yk}x_j + c_{yk}$, where $$m_{yk} = \frac{y_{k,2} - y_{k,1}}{x_{j,2} - x_{j,1}}$$

and $c_{yk} = y_{k,1} - x_{j,1}m_{yk}$. Further, $x_i = m_{xi}x_j + c_{xi}$, where $$m_{xi} = \frac{x_{i,2} - x_{i,1}}{x_{j,2} - x_{j,1}}$$

and $c_{xi} = x_{i,1} - x_{j,1}m_{xi}$. Equation (1) can then be re-written as:

$$\sum_{k \in S_{ny}} a_{1k}y_k^2 + \sum_{k,l \in S_{ny}, l \neq k} a_{2kl}y_k y_l + \sum_{k \in S_{ny}} a_{3k}y_k +$$
$$x_j \sum_{k,l \in S_{ny}} c_{1klj}y_k y_l + \sum_{k,l \in S_{ny}, i \in S_{nx}, i \neq j} c_{1kli}y_k y_l x_i + x_j \sum_{k \in S_{ny}} c_{2kj}y_k +$$
$$\sum_{k \in S_{ny}, l \in S_{nx}, l \neq j} c_{2kl}y_k x_l + x_j^2 \sum_{k \in S_{ny}} c_{3kjj}y_k + x_j \sum_{k \in S_{ny}, l \in S_{nx}, l \neq y} c_{3klj}y_k x_l +$$
$$x_j \sum_{k \in S_{ny}, i \in S_{nx}, i \neq j} c_{3kji}y_k x_i + \sum_{k \in S_{ny}, l, i \in S_{nx}, l \& i \neq j} c_{3kli}y_k x_l x_i =$$
$$b_{1j}x_j^3 + \sum_{l \in S_{nx}, l \neq j} b_{1l}x_l^3 + x_j^2 \sum_{k \in S_{nx}, k \neq j} b_{2jk}x_k + x_j \sum_{l \in S_{nx}, l \neq j} b_{2lj}x_l^2 +$$
$$\sum_{l,k \in S_{nx}, l \neq j, l \neq k} b_{2lk}x_l^2 x_k + b_{3jj}x_j^2 + x_j \sum_{k \in S_{nx}, k \neq j} b_{3jk}x_k +$$
$$x_j \sum_{l \in S_{nx}, l \neq j} b_{3lj}x_l + \sum_{l,k \in S_{nx}, l, k \neq j} b_{3lk}x_l x_k + b_{4j}x_j + \sum_{k \in S_{nx}, k \neq j} b_{4k}x_k + b_c,$$

and substitution of the above into the rewritten equation (1) for $y_k$, $k \in S_{ny}$, and $x_i$, $i \in S_{nx}$ & $i \neq j$, results in:

$$\sum_{k \in S_{ny}} a_{1k}(m_{yk}x_j + c_{yk})^2 + \sum_{k,l \in S_{ny}, l \neq k} a_{2kl}(m_{yk}x_j + c_{yk})(m_{yl}x_j + c_{yl}) +$$
$$\sum_{k \in S_{ny}} a_{3k}(m_{yk}x_j + c_{yk}) + x_j \sum_{k,l \in S_{ny}} c_{1klj}(m_{yk}x_j + c_{yk})(m_{yl}x_j + c_{yl}) +$$
$$\sum_{k,l \in S_{ny}, i \in S_{nx}, i \neq j} c_{1kli}(m_{yk}x_j + c_{yk})(m_{yl}x_j + c_{yl})(m_{xi}x_j + c_{xi}) +$$
$$x_j \sum_{k \in S_{ny}} c_{2kj}(m_{yk}x_j + c_{yk}) + \sum_{k \in S_{ny}, l \in S_{nx}, l \neq j} c_{2kl}(m_{yk}x_j + c_{yk})(m_{xl}x_j + c_{xl}) +$$
$$x_j^2 \sum_{k \in S_{ny}} c_{3kjj}(m_{yk}x_j + c_{yk}) +$$
$$x_j \sum_{k \in S_{ny}, l \in S_{nx}, l \neq j} c_{3klj}(m_{yk}x_j + c_{yk})(m_{xl}x_j + c_{xl}) +$$
$$x_j \sum_{k \in S_{ny}, i \in S_{nx}, i \neq j} c_{3kji}(m_{yk}x_j + c_{yk})(m_{xi}x_j + c_{xi}) +$$
$$\sum_{k \in S_{ny}, l, i \in S_{nx}, l \& i \neq j} c_{3kli}(m_{yk}x_j + c_{yk})(m_{xl}x_j + c_{xl})(m_{xi}x_j + c_{xi}) =$$
$$b_{1j}x_j^3 + \sum_{l \in S_{nx}, l \neq j} b_{1l}(m_{xl}x_j + c_l)^3 + x_j^2 \sum_{k \in S_{nx}, k \neq j} b_{2jk}(m_{xk}x_j + c_{xk}) +$$
$$x_j \sum_{l \in S_{nx}, l \neq j} b_{2lj}(m_{xl}x_j + c_{xl})^2 +$$
$$\sum_{l,k \in S_{nx}, l \& k \neq j, l \neq k} b_{2lk}(m_{xl}x_j + c_{xl})^2(m_{xk}x_j + c_{xk}) + b_{3jj}x_j^2 +$$
$$x_j \sum_{k \in S_{nx}, k \neq j} b_{3jk}(m_{xk}x_j + c_{xk}) + x_j \sum_{l \in S_{nx}, l \neq j} b_{3lj}(m_{xl}x_j + c_{xl}) +$$
$$\sum_{l,k \in S_{nx}, l \& k \neq j} b_{3lk}(m_{xl}x_j + c_{xl})(m_{xk}x_j + c_{xk}) +$$
$$b_{4j}x_j + \sum_{k \in S_{nx}, k \neq j} a_{6k}(m_{xk}x_j + c_{xk}) + b_c$$

Expanding the terms in the above equation leads to a cubic equation in $x_j$, $C_3 x_j^3 + C_2 x_j^2 + C_1 x_j + C_0 = 0$, where $C_3, C_2, C_1$ & $C_0$ are obtained from the above equation.

Assuming. $C_3 \neq 0$, the above cubic equation in $x_j$ has three roots $x_{j,1}, x_{j,2}$, & $x'_{j,3}$ and can be written as $(x_j - x_{j,1})(x_j - x_{j,2})$ $(x_j - x'_{j,3}) = 0$. Normalizing by the coefficient of $x^3$ and equating the coefficients of $x^2$ in the resulting equation with that in $(x_j - x_{j,1})(x_j - x_{j,2})(x_j - x'_{j,3}) = 0$, one obtains a solution for $x'_{j,3}$:

$$x'_{j,3} = \frac{-C_2}{C_3} - x_{j,1} - x_{j,2}. \quad (2)$$

The values of $y'_{k,3}, k \in S_{ny}$, and $x'_{i,3}, i \in S_{nx}$ & $i \neq j$, may be similarly obtained from equations for $x_j = x'_{j,3}$.

For cases where $C_3 = 0$, $C_3 x_j^3 + C_2 x_j^2 + C_1 x_j + C_0 = 0$ becomes a quadratic equation. Such quadratic equations may be used in the definition of point equivalences.

With regard to Case B for all $j \in S_{nx}$, $x_{j,1} = x_{j,2}$, the three sub-cases are considered below. In all cases, $x_{j,o}$ is defined as $x_{j,o} = x_{j,1} = x_{j,2}, j \in S_{nx}$.

For Case B.i., all $k \in S_{ny}$, $y_{k,1} = y_{k,2}$, which corresponds to point doubling. In this case, $(x_{0,1}, x_{1,1}, \ldots, x_{nx,1}, y_{0,1}, y_{1,1}, \ldots, y_{ny,1}) = (x_{0,2}, x_{1,2}, \ldots, x_{nx,2}, y_{0,2}, \ldots, y_{ny,2})$. Letting:

$(x_{0,o}, x_{1,o}, \ldots, x_{nx,o}, y_{0,o}, y_{1,o}, \ldots, y_{ny,o}) = (x_{0,1},$
$x_{1,1}, \ldots, x_{nx,1}, y_{0,1}, y_{1,1}, \ldots, y_{ny,1}) = (x_{0,2},$
$x_{1,2}, \ldots, x_{nx,2}, y_{0,2}, y_{1,2}, \ldots, y_{ny,2})$ the sum is written as $(x_{0,3}, x_{1,3}, \ldots, x_{nx,3}, y_{0,3}, y_{1,3}, \ldots, y_{ny,3}) = (x_{0,o},$
$x_{1,o}, \ldots, x_{nx,o}, y_{0,o}, y_{1,o}, \ldots, y_{ny,o}) + (x_{0,o},$
$x_{1,o}, \ldots, x_{ns,o}, y_{0,o}, y_{1,o}, \ldots, y_{ny,o})$ (3).

There are several ways of defining the addition in this case. Three possible rules are described below. Case B.i.1: Letting $S_{nx,Lx}$ denote a subset of $S_{nx}$ with Lx elements, i.e., $S_{nx,Lx} \subseteq S_{nx}$; letting $S_{ny,Ly}$ denote a subset of $S_{ny}$ with Ly elements and which does not include the element 0; i.e. $S_{ny,Ly} \subseteq S_{ny}$ and $0 \notin S_{ny,Ly}$; setting the value of Lx and Ly as at least one, then the straight line in this case can be defined as a tangent to the point $(x_{0,o}, x_{1,o}, \ldots, x_{nx,o}, y_{0,o}, y_{1,o}, \ldots, y_{ny,o})$ defined in a sub-dimensional space with coordinates $y_n$ and $x_m$ with $n \in S_{ny,Ly}$ and $m \in S_{nx,Lx}$.

In this case, the gradients $m_{yn}$ and $m_{xm}$ of the straight line to be used in equation (2) are essentially the first derivatives of $y_n$ and $x_m$, $n \in S_{ny,Ly}$ and $m \in S_{nx,Lx}$, for F with respect to $x_j$, $j \in S_{nx,Lx}$, i.e., $$m_{yn} = \frac{dy_n}{dx_j} \text{ and } m_{xn} = \frac{dx_m}{dx_j}.$$

Using these derivatives for the values of the gradients, $$m_{yn} = \frac{dy_n}{dx_j},$$

where $n \in S_{ny,Ly}$, and $$m_{xn} = \frac{dx_m}{dx_j},$$

where $m \in S_{nx,Lx}$, in equation (2) and noting that it is assumed that $$\frac{dx_m}{dx_j} = 0,$$

for $m \in (S_{nx} - S_{nx,Lx})$ and $$\frac{dy_n}{dx_j} = 0,$$

for $n \in (S_{ny} - S_{ny,Ly})$, then a solution for $x'_{j,3}$ may be obtained.

The values of $y'_{n,3}$ for $n \in S_{ny}$ and $x'_{m,3}$, for $m \in S_{nx}$ & $m \neq j$, can further be obtained for $x_j = x'_{j,3}$. The choice of the $x_m$-coordinates, $m \in S_{nx,Lx}$, and $y_n$-coordinates, $n \in S_{ny,Ly}$, which can be used to compute the tangent of the straight line in this case may be chosen at random or according to a pre-defined rule. Further, a different choice of the $x_m$-coordinates, $m \in S_{nx,Lx}$, and $y_n$-coordinates, $n \in S_{ny,Ly}$, may be made when one needs to compute successive point doublings, such as that needed in scalar multiplication.

With regard to the next case, Case B.i.2, the second possible way of defining the addition of a point with itself is to apply a sequence of the point doublings according to the rule defined above in Case B.i.1, where the rule is applied with a different selection of the x-coordinate(s) and y-coordinates(s) in each step of this sequence.

In the third sub-case, Case B.i.3, a point is substituted with one of its equivalents. Letting $(x_{0,oe}, x_{1,oe}, \ldots, x_{nx,oe}, y_{0,oe}, y_{1,oe}, \ldots, y_{ny,oe})$ represent the equivalent point of $(x_{0,o}, x_{1,o}, \ldots, x_{nx,o}, y_{0,o}, y_{1,o}, \ldots, y_{ny,o})$, then equation (3) may be written as:

$(x_{0,3}, x_{1,3}, \ldots, x_{nx,3}, y_{0,3}, y_{1,3}, \ldots, y_{ny,3}) = (x_{0,o},$
$x_{1,o}, \ldots, x_{nx,o}, y_{0,o}, y_{1,o}, \ldots, y_{ny,o}) + (x_{0,oe},$
$x_{1,oe}, \ldots, x_{nx,oe}, y_{0,oe}, y_{1,oe}, \ldots, y_{ny,oe})$ With regard to Case B.ii, for $k \in S_{ny}$ & $k \neq 0$, $y_{k,1} = y_{k,2}$, and where $y_{0,1}$ & $y_{0,2}$ are the roots of the quadratic equation in $y_0$, this case corresponds to generation of the point inverse.

Letting $y_{k,1} = y_{k,2} = y_{k,o}$ for $k \in S_{ny}$ & $k \neq 0$, then any two points, such as the point $(x_{0,o}, x_{1,o}, \ldots, x_{nx,o}, y_{0,1}, y_{1,o}, \ldots, y_{ny,o}) \in EC^{nx+ny+2}$ and the point $(x_{0,o}, x_{1,o}, \ldots, x_{nx,o}, y_{0,2}, y_{1,o}, \ldots, y_{ny,o}) \in EC^{nx+ny+2}$, are in the hyper-plane with $x_i = x_{idol}, i \in S_{nx}$ and $y_k = y_{kohl}, k \in S_{ny}$ & $k \neq 0$. Thus, any straight line joining these two points such that $(x_{0,o}, x_{1,o}, \ldots, x_{nx,o}, y_{0,1}, y_{1,o}, \ldots, y_{ny,o}) \neq (x_{0,o}, x_{1,o}, \ldots, x_{nx,o}, y_{0,2}, y_{1,o}, \ldots, y_{ny,o})$ is also in this hyper-plane.

Substituting the values of $x_{0,o}, x_{1,o}, \ldots, x_{nx,o}, y_{1,o}, \ldots,$ & $y_{nylon}$ in an elliptic polynomial equation with multiple x-coordinates and multiple y-coordinates, a quadratic equation for $y_0$ is obtained, as given above. Thus, $y_0$ has only two solutions, $y_{0,1}$ & $y_{0,2}$.

Thus, a line joining points $(x_{0,o}, x_{1,o}, \ldots, x_{nx,o}, y_{0,1}, y_{1,o}, \ldots, y_{ny,o}) \in EC^{nx+ny+2}$ and $(x_{0,o}, x_{1,o}, \ldots, x_{nx,o}, y_{0,2}, y_{1,o}, \ldots, y_{ny,o}) \in EC^{nx+ny+2}$ does not intersect with $EC^{nx+ny+2}$ at a third point.

A line that joins these two points is assumed to intersect with $EC^{nx+ny+2}$ at infinity $(x_{0,1}, x_{1,1}, \ldots, x_{nx,1}, y_{0,1}, y_{1,1}, \ldots, y_{ny,1}) \in EX^{nx+ny+2}$. This point at infinity is used to define both the inverse of a point in $EC^{nx+ny+2}$ and the identity point. According to the addition rule defined above, one can write:

$(x_0, x_1, \ldots, x_{nx}, y_{0,1}, y_1, \ldots, y_{ny}) + (x_0, x_1, \ldots, x_{nx}, y_{0,2},$
$y_1, \ldots, y_{ny}) = (x_{0,1}, x_{1,1}, \ldots, x_{nx,1}, y_{0,1}, y_{1,1}, \ldots,$
$y_{ny,1})$tm (4), since the third point of intersection of such lines is assumed to be at infinity, $(x_{0,1}, x_{1,1}, \ldots, x_{nx,1}, y_{0,1}, y_{1,1}, \ldots, y_{ny,1}) \in EC^{nx+ny+2}$. Thus, this equation defines a unique inverse for any point $(x_0, x_1, \ldots, x_{nx}, y_0, y_1, \ldots, y_{ny}) \in EC^{nx+ny+2}$, namely:

$$-(x_0, x_1, \ldots, x_{nx}, y_0, y_1, \ldots, y_{ny}) = (x_0, x_1, \ldots, x_{nx}, y_{0,2}, y_1, \ldots, y_{ny}).$$

Thus, equation (4) can be written as:

$$(x_0, x_1, \ldots, x_{nx}, y_{0,1}, y_1, \ldots, y_{ny}) - (x_0, x_1, \ldots, x_{nx}, y_{0,1}, y_1, \ldots, y_{ny}) = (x_{0,1}, x_{1,1}, \ldots, x_{nx,1}, y_{0,1}, y_{1,1}, \ldots, y_{ny,1}) \quad (5).$$

Further, a line joining the point at infinity $(x_{0,1}, x_{1,1}, \ldots, x_{nx,1}, y_{0,1}, y_{1,1}, \ldots, y_{ny,1}) \in EC^{nx+ny+2}$ and a point $(x_0, x_1, \ldots, x_{nx}, y_{0,1}, y_1, \ldots, y_{ny}) \in EC^{nx+ny+2}$ will intersect with $EC^{nx+ny+2}$ at $(x_0, x_1, \ldots, x_{nx}, y_{0,2}, y_1, \ldots, y_{ny}) \in EC^{nx+ny+2}$. Thus, from the addition rule defined above, $$(x_0, x_1, \ldots, x_{nx}, y_0, y_1, y_2, \ldots, y_{ny}) + (x_{0,1}, x_{1,1}, \ldots, x_{nx,1}, y_{0,1}, y_{1,1}, \ldots, y_{ny}) = (x_0, x_1, \ldots, x_{nx}, y_0, y_1, \ldots, y_{ny}) \quad (6).$$

Equation (5) satisfies axiom (ii) while equation (6) satisfies axiom (i), defined above.

Case B.iii applies for all other conditions except those in cases B.i and B.ii. This case occurs only when ny is greater than or equal to one. Given two points $(x_{0,o}, x_{1,o}, \ldots, x_{nx,o}, y_{0,1}, y_{1,1}, \ldots, y_{ny,1}) \in EC^{nx+ny+2}$ and $(x_{0,o}, x_{1,o}, \ldots, x_{nx,o}, y_{0,2}, y_{1,2}, \ldots, y_{ny,2}) \in EC^{nx+ny+2}$ that do not satisfy the conditions of cases B.i and B.ii above, the sum point is written as $$(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,1}, y_{1,1}, \ldots, y_{ny,1}) + (x_{0,o}, x_{1,o}, \ldots, x_{nx,o}, y_{0,2}, y_{1,2}, \ldots, y_{ny,2})$$

There are several possible rules to find the sum point in this case. Three possible methods are given below.

1) Using three point doublings and one point addition, $$(x_{0,3}, x_{1,3}, \ldots, x_{nx,3}, y_{0,3}, y_{1,3}, \ldots, y_{ny,3}) = 4(x_{0,o}, x_{1,o}, \ldots, x_{nx,o}, y_{0,1}, y_{1,1}, \ldots, y_{ny,1}) - 2(x_{0,o}, x_{1,o}, \ldots, x_{nx,o}, y_{0,2}, y_{1,2}, \ldots, y_{ny,2});$$

2) using one point doublings and three point additions, $$(x_{0,3}, x_{1,3}, \ldots, x_{nx,3}, y_{0,3}, y_{1,3}, \ldots, y_{ny,3}) = (2(x_{0,o}, x_{1,o}, \ldots, x_{nx,o}, y_{0,1}, y_{1,1}, \ldots, y_{ny,1}) + (x_{0,o}, x_{1,o}, \ldots, x_{nx,o}, y_{0,2}, y_{1,2}, \ldots, y_{ny,2})) - (x_{0,o}, x_{1,o}, \ldots, x_{nx,o}, y_{0,1}, y_{1,1}, \ldots, y_{ny,1}); \text{ and}$$

3) using point equivalence, $$(x_{0,3}, x_{1,3}, \ldots, x_{nx,3}, y_{0,3}, y_{1,3}, \ldots, y_{ny,3}) = (x_{0,o}, x_{1,o}, \ldots, x_{nx,o}, y_{0,1}, y_{1,1}, \ldots, y_{ny,1}) + (x_{0,oe}, x_{1,oe}, \ldots, x_{nx,oe}, y_{0,2e}, y_{1,2e}, \ldots, y_{ny,2e}),$$

where $(x_{0,oe}, x_{1,oe}, \ldots, x_{nx,oe}, y_{0,2e}, y_{1,2e}, \ldots, y_{ny,2e})$ is assumed to be the equivalent point of $(x_{0,o}, x_{1,o}, \ldots, x_{nx,o}, y_{0,2}, y_{1,2}, \ldots, y_{ny,2})$.

It should be noted that the above methods for defining the sum point are not the only ones that can be defined and are provided for exemplary purposes only. The choice of method used to obtain the sum point in this case should depend on the computation complexity of point addition and point doubling.

With regard to associativity, one way of proving associativity of $(EC^{nx+ny+2}, +)$ is as follows: Given particular elliptic polynomial equations (i.e., for particular coefficients $a_{1l}, a_{2kl}, a_{3k}, c_{1lki}, c_{2kl}, c_{3kli}, b_{1l}, b_{2lk}, b_{3lk}, b_{4k}, b_c \in F$) defined over a finite field F, if it can be shown by computation that any point $Q \in EC^{nx+ny+2}$ (and any of its equivalent points) can be uniquely written as $k_Q P \in EC^{nx+ny+2}$, where P is the generator point of $(EC^{nx+ny+2}, +)$, then the corresponding $EC^{nx+ny+2}$ groups based on such polynomials are associative. This is because any three points $Q, R, S \in EC^{nx+ny+2}$ (or any of their equivalent points) can be written as $k_Q P, k_R P, k_S P \in EC^{nx+ny+2}$, respectively, thus their sum $(Q+R+S) = (k_Q P + k_R P + k_S P) = (k_Q + k_R + k_S) P$ can be carried out in any order.

The following elliptic polynomial equation with nx=1 and ny=0 is used to show an example of the equations in Case A used in point addition: $y_0^2 = x_0^3 + x_1^3 + x_0 x_1$. Choosing $x_j = x_0$, and substituting $y_k = m_{yk} x_j + c_{yk}$ from Case A above for $y_0$, and the corresponding equation $x_i = m_{xi} x_j + c_{xi}$ for $x_1$, one obtains $(m_{y0} x_0 + c_{y0})^2 = x_0^3 + (m_{x1} x_0 + c_{x1})^3 + x_0 (m_{x1} x_0 + c_{x1})$.

Expanding this equation yields the equation $m_{y0}^2 x_0^2 + 2 m_{y0} c_{y0} x_0 + c_{y0}^2 = x_0^3 + m_{x1}^3 x_0^3 + 3 m_{x1}^2 c_{x1} x_0^2 + 3 m_{x1} c_{x1}^2 x_0 + c_{x1}^3 + m_{x1} x_0^2 + c_{x1} x_0$, or $(1 + m_{x1}^3) x_0^3 + (3 m_{x1}^2 c_{x1} + m_{x1} - m_{y0}^2) x_0^2 + (3 m_{x1} c_{x1}^2 + c_{x1} - 2 m_{y0} c_{y0}) x_0 + c_{x1}^3 - c_{y0}^2 = 0$. From equation (2), the solution for $x'_{0,3}$ in this case is obtained:

$$x'_{0,3} = \frac{-(3 m_{x1}^2 c_{x1} + m_{x1} - m_{y0}^2)}{(1 + m_{x1}^3)} - x_{j,1} - x_{j,2}.$$

Similarly, one can obtain the values of $y'_{0,3}$ and $x'_{1,3}$ for $x_0 = x'_{0,3}$.

It should be noted that when $m_{x,1} = -1$, the coefficient of the cubic term in the above is zero; i.e. $C_3 = 0$. In this case, the resulting quadratic equation can be used in the definition of point equivalences for the points that satisfy the elliptic polynomial equation.

Each of the equations for point addition and point doublings derived for cases A and B above require modular inversion or division. In cases where field inversions or divisions are significantly more expensive (in terms of computational time and energy) than multiplication, projective coordinates are used to remove the requirement for field inversion or division from these equations.

Several projective coordinates can be utilized. In the preferred embodiment, the Jacobean projective coordinate system is used. As an example, we examine:

$$x_i = \frac{X_i}{V^2} \text{ for } i \in S_{nx}; \quad (7)$$

and $$y_k = \frac{Y_k}{V^3} \text{ for } k \in S_{ny}. \quad (8)$$

Using jacobian projection yields:

$$\sum_{k \in S_{ny}} a_{1k} \frac{Y_k^2}{V^6} + \sum_{k,l \in S_{ny}, l \neq k} a_{2kl} \frac{Y_k}{V^3} \frac{Y_l}{V^3} + \sum_{k \in S_{ny}} a_{3k} \frac{Y_k}{V^3} + \quad (9)$$

$$\sum_{k,l \in S_{ny}, i \in S_{nx}} c_{1kli} \frac{Y_k}{V^3} \frac{Y_l}{V^3} \frac{X_i}{V^2} + \sum_{k \in S_{ny}, i \in S_{nx}} c_{2ki} \frac{Y_k}{V^3} \frac{X_i}{V^2} +$$

$$\sum_{k \in S_{ny}, l, i \in S_{nx}} c_{3kli} \frac{Y_k}{V^3} \frac{X_l}{V^2} \frac{X_i}{V^2} = \sum_{l \in S_{nx}} b_{1l} \frac{X_l^3}{V^6} +$$

$$\sum_{l,k \in S_{nx}, l \neq k} b_{2lk} \frac{X_l^2}{V^4} \frac{X_k}{V^2} + \sum_{l,k \in S_{nx}} b_{3lk} \frac{X_l}{V^2} \frac{X_k}{V^2} + \sum_{k \in S_{nx}} b_{4k} \frac{X_k}{V^2} + b_c$$

which can be rewritten as:

$$\sum_{k \in S_{ny}} a_{1k} Y_k^2 V^2 + \sum_{k,l \in S_{ny}, l \neq k} a_{2kl} Y_k Y_l V^2 + \quad (10)$$

$$\sum_{k \in S_{ny}} a_{3k} Y_k V^5 + \sum_{k,l \in S_{ny}, i \in S_{nx}} c_{1kli} Y_k Y_l X_i +$$

$$\sum_{k \in S_{ny}, l \in S_{nx}} c_{2kl} Y_k X_l V^3 + \sum_{k \in S_{ny}, l,i \in S_{nx}} c_{3kli} Y_k X_l X_i V =$$

$$\sum_{l \in S_{nx}} b_{1l} X_l^3 V^2 + \sum_{l,k \in S_{nx}, l \neq k} b_{2lk} X_l^2 X_k V^2 +$$

$$\sum_{l,k \in S_{nx}} b_{3lk} X_l X_k V^4 + \sum_{k \in S_{nx}} b_{4k} X_k V^6 + b_c V^8.$$

In the following, the points $(X_0, X_1, \ldots, X_{nx}, Y_0, Y_1, \ldots, Y_{ny}, V)$ are assumed to satisfy equation (10). When $V \neq 0$, the projected point $(X_0, X_1, \ldots, X_{nx}, Y_0, Y_1, \ldots, Y_{ny}, V)$ corresponds to the point:

$$(x_0, x_1, \ldots, x_{nx}, y_0, y_1, \ldots, y_{ny}) =$$
$$\left( \frac{X_0}{V^2}, \frac{X_1}{V^2}, \ldots, \frac{X_{nx}}{V^2}, \frac{Y_0}{V^3}, \frac{Y_1}{V^3}, \ldots, \frac{Y_{ny}}{V^3} \right),$$

which satisfies equation (1).

Using Jacobean projective coordinates, equation (10) can be written as:

$$\left( \frac{X_{0,3}}{V_3^2}, \frac{X_{1,3}}{V_3^2}, \ldots, \frac{X_{nx,3}}{V_3^2}, \frac{Y_{0,3}}{V_3^3}, \frac{Y_{1,3}}{V_3^3}, \ldots, \frac{Y_{ny,3}}{V_3^3} \right) = \quad (11)$$
$$\left( \frac{X_{0,1}}{V_1^2}, \frac{X_{1,1}}{V_1^2}, \ldots, \frac{X_{nx,1}}{V_1^2}, \frac{Y_{0,1}}{V_1^3}, \frac{Y_{1,1}}{V_1^3}, \ldots, \frac{Y_{ny,1}}{V_1^3} \right) +$$
$$\left( \frac{X_{0,2}}{V_2^2}, \frac{X_{1,2}}{V_2^2}, \ldots, \frac{X_{nx,2}}{V_2^2}, \frac{Y_{0,2}}{V_2^3}, \frac{Y_{1,2}}{V_2^3}, \ldots, \frac{Y_{ny,2}}{V_2^3} \right).$$

By using jacobian projective coordinates in the equations of Cases A and B above, and by an appropriate choice of the value of $V_3$, it can be shown that point doubling and point addition can be computed without the need for field inversion or division.

As described above, conventional bit string embedding into an elliptic polynomial point involves an iterative algorithm to search for an x-coordinate value which will lead to a quadratic residue value of the y-coordinate starting from an initial x-coordinate value specified by the bit string to be embedded. However, such a process requires that the number of iterations needed is different for different bit strings that are being embedded. In the present method, an embedding methodology is utilized that embeds a bit string into an appropriate elliptic polynomial point with (nx+1) x-coordinates and (ny+1) y-coordinates in a deterministic and non-iterative manner. Further, the elliptic polynomial equation is of a specified form, i.e., it is isomorphic to its twist. This method circumvents the need for an iterative algorithm that involves the usual search for a quadratic residue value of the y-coordinate (which typically requires several iterations) and, further, suffers from the drawback that the number of iterations needed is different for different bit strings that are being embedded.

In order to examine the embedding method, the twist of an elliptic polynomial equation needs to be defined. Given an elliptic polynomial with (nx+1) x-coordinates and (ny+1) y-coordinates of the form described above:

$$y_0^2 + \sum_{k \in S_{ny}} a_{1k} y_k^2 + \sum_{k,l \in S_{ny}, l \neq k} a_{2kl} y_k y_l = \quad (12)$$
$$\sum_{l \in S_{nx}} b_{1l} x_l^3 + \sum_{l,k \in S_{nx}, l \neq k} b_{2lk} x_l^2 x_k,$$

where $a_{1l}, a_{2kl}, b_{1l}, b_{2lk} \in F$.

Given certain values for the x-coordinates $x_{0,o}, x_{1,o}, \ldots, x_{nx,o}$ and y-coordinates $y_{1,o}, \ldots, y_{ny,o}$, respectively, that are elements of the finite field, F, these values are substituted into the elliptic polynomial equation (1) in order to obtain a quadratic equation in $y_0$:

$$y_0^2 = - \sum_{k \in S_{ny}} a_{1k} y_{k,o}^2 - \sum_{k,l \in S_{ny}, l \neq k} a_{2kl} y_{k,o} y_{l,o} +$$
$$\sum_{l \in S_{nx}} b_{1l} x_{l,o}^3 + \sum_{l,k \in S_{nx}, l \neq k} b_{2lk} x_{l,o}^2 x_{k,o} = T.$$

If a solution of the above quadratic equation (i.e., $y_0^2 = T$) is an element of the finite field F, the point $(x_{0,o}, x_{1,o}, \ldots, x_{nx,o}, y_0, y_{1,o}, \ldots, y_{ny,o})$ is said to satisfy the given elliptic polynomial equation. If a solution of the above quadratic equation is not an element of the finite field F, the point $(x_{0,o}, x_{1,o}, \ldots, x_{nx,o}, y_0, y_{1,o}, \ldots, y_{ny,o})$ is said to satisfy the twist of the given elliptic polynomial equation. The inventive embedding method is based on the isomorphic relationship between a polynomial and its twist as described in the following theorem:

An elliptic polynomial equation of the form given above is isomorphic to its twist if:
1) there are mathematical mappings that can be defined on the values of $x_0, x_1, \ldots, x_{nx}, y_1, \ldots, y_{ny}$ (i.e., $\phi_x(x_i)$ and $\phi_y(y_i)$) such that any point $(x_0, x_1, \ldots, x_{nx}, y_0, y_1, \ldots, y_{ny})$ that satisfies such an elliptic polynomial equation can be mapped into another point $(\phi_x(x_0), \phi_x(x_1), \ldots, \phi_x(x_{xn}), \phi_y(y_0), \phi_y(y_1), \ldots, \phi_y(y_{ny}))$ that satisfies the twist of the same elliptic polynomial equation; and
2) the mapping between the points $(x_0, x_1, \ldots, x_{nx}, y_0, y_1, \ldots, y_{ny})$ and $(\phi_x(x_0), \phi_x(x_1), \ldots, \phi_x(x_{xn}), \phi_y(y_0), \phi_y(y_1), \ldots, \phi_y(y_{ny}))$ is unique, i.e., a one-to-one correspondence.

The proof of this theorem is as follows. Re-writing equation (12) as:

$$y_0^2 = \quad (13)$$
$$- \sum_{k \in S_{ny}} a_{1k} y_k^2 - \sum_{k,l \in S_{ny}, l \neq k} a_{2kl} y_k y_l + \sum_{l \in S_{nx}} b_{1l} x_l^3 + \sum_{l,k \in S_{nx}, l \neq k} b_{2lk} x_l^2 x_k,$$

and letting the right-hand side of equation (13) be denoted as T, then:

$$T = - \sum_{k \in S_{ny}} a_{1k} y_k^2 - \sum_{k,l \in S_{ny}, l \neq k} a_{2kl} y_k y_l + \sum_{l \in S_{nx}} b_{1l} x_l^3 + \sum_{l,k \in S_{nx}, l \neq k} b_{2lk} x_l^2 x_k. \quad (14)$$

Thus, any value of $x_0, x_1, \ldots, x_{nx}, y_1, \ldots, y_{ny}$ will lead to a value of $T \in F(p)$. T could be quadratic residue or non-quadratic residue. If T is quadratic residue, then equation (14) is written as:

$$T_q = -\sum_{k \in S_{ny}} a_{1k} y_{k,q}^2 - \sum_{k,l \in S_{ny}, l \neq k} a_{2kl} y_{k,q} y_{l,q} + \sum_{l \in S_{nx}} b_{1l} x_{l,q}^3 + \sum_{l,k \in S_{nx}, l \neq k} b_{2lk} x_{l,q}^2 x_{k,q} \quad (15)$$

where $x_{0,q}, x_{1,q}, \ldots, x_{nx,q}, y_{1,q}, \ldots, y_{ny,q} \in F$ denotes the values of $x_0, x_1, \ldots, x_{nx}, y_1, \ldots, y_{ny}$ that result in a quadratic residue value of T, which is hereafter denoted as $T_q$.

If T is non-quadratic residue, then equation (14) is written as:

$$T_{\bar{q}} = -\sum_{k \in S_{ny}} a_{1k} y_{k,\bar{q}}^2 - \sum_{k,l \in S_{ny}, l \neq k} a_{2kl} y_{k,\bar{q}} y_{l,\bar{q}} + \sum_{l \in S_{nx}} b_{1l} x_{l,\bar{q}}^3 + \sum_{l,k \in S_{nx}, l \neq k} b_{2lk} x_{l,\bar{q}}^2 x_{k,\bar{q}} \quad (16)$$

where $x_{0,\bar{q}}, x_{1,\bar{q}}, \ldots, x_{nx,\bar{q}}, y_{1,\bar{q}}, \ldots, y_{ny,\bar{q}} \in F$ denotes the values of $x_0, x_1, \ldots, x_{nx}, y_1, \ldots, y_{ny}$ that result in a non-quadratic residue value of T, denoted as $T_{\bar{q}}$.

Letting g be any non-quadratic residue number in F (i.e., $g \in F(p)$ & $\sqrt{g} \notin F(p)$), then multiplying equation (15) with $g^3$ yields:

$$g^3 T_q = -g^3 \sum_{k \in S_{ny}} a_{1k} y_{k,q}^2 - g^3 \sum_{k,l \in S_{ny}, l \neq k} a_{2kl} y_{k,q} y_{l,q} + g^3 \sum_{l \in S_{nx}} b_{1l} x_{l,q}^3 + g^3 \sum_{l,k \in S_{nx}, l \neq k} b_{2lk} x_{l,q}^2 x_{k,q},$$

which can be re-written as:

$$g^3 T_q = \\ -\sum_{k \in S_{ny}} a_{1k} (\sqrt{g^3} \, y_{k,q}^2)^2 - \sum_{k,l \in S_{ny}, l \neq k} a_{2kl} g^3 (\sqrt{g^3} \, y_{k,q})(\sqrt{g^3} \, y_{l,q}) + \sum_{l \in S_{nx}} b_{1l} (g x_{l,q})^3 + \sum_{l,k \in S_{nx}, l \neq k} b_{2lk} (g x_{l,q})^2 (g x_{k,q}). \quad (17)$$

It should be noted that if g is non-quadratic residue, then $g^3$ is also non-quadratic residue. Further, the result of multiplying a quadratic residue number by a non-quadratic residue number is a non-quadratic residue number. Thus, $g^3 T_q$ is non-quadratic residue.

By comparing the terms of equations (16) and (17), we obtain the following mappings:

$$x_{i,\bar{q}} = g x_{i,q}; \quad (18)$$

$$y_{i,\bar{q}} = \sqrt{g^3} \, y_{i,q}; \quad (19); \text{ and}$$

$$T_{\bar{q}} = g^3 T_q \quad (20).$$

The mappings between the variables $x_{i,q}$ and $x_{i,\bar{q}}$ in equation (18), $y_{i,q}$ and $y_{i,\bar{q}}$ in equation (19), $T_q$ and $T_{\bar{q}}$ in equation (20) are all bijective, i.e., there is a one-to-one correspondence from basic finite field arithmetic. As a consequence, the mappings between the (nx+ny+2)-tuple $(x_{0,q}, x_{1,q}, \ldots, x_{nx,q}, T_q, y_{1,q}, \ldots, y_{ny,q})$ and the (nx+ny+2)-tuple $(x_{0,\bar{q}}, x_{1,\bar{q}}, \ldots, x_{nx,\bar{q}}, T_{\bar{q}}, y_{1,\bar{q}}, \ldots, y_{ny,\bar{q}})$ are also bijective.

Therefore, for every solution of equation (15), there is an isomorphic solution which satisfies equation (16), and since the mappings of the coordinates of one to the other are given in equations (18)-(20), these two solutions are isomorphic with respect to each other.

Since $T_q$ is quadratic residue, this expression can be written as:

$$T_q = y_0^2. \quad (21)$$

Thus, from equation (20), $T_{\bar{q}}$ can be written as:

$$T_{\bar{q}} = g^3 y_0^2 \quad (22).$$

Using equations (21) and (22), equations (15) and (16) can be written as:

$$y_0^2 = -\sum_{k \in S_{ny}} a_{1k} y_{k,q}^2 - \sum_{k,l \in S_{ny}, l \neq k} a_{2kl} y_{k,q} y_{l,q} + \sum_{l \in S_{nx}} b_{1l} x_{l,q}^3 + \sum_{l,k \in S_{nx}, l \neq k} b_{2lk} x_{l,q}^2 x_{k,q}; \quad (23)$$

and $$g^3 y_0^2 = -\sum_{k \in S_{ny}} a_{1k} y_{k,\bar{q}}^2 - \sum_{k,l \in S_{ny}, l \neq k} a_{2kl} y_{k,\bar{q}} y_{l,\bar{q}} + \sum_{l \in S_{nx}} b_{1l} x_{l,\bar{q}}^3 + \sum_{l,k \in S_{nx}, l \neq k} b_{2lk} x_{l,\bar{q}}^2 x_{k,\bar{q}}. \quad (24)$$

Since any solution of equation (15) has an isomorphic solution that satisfies equation (16), it follows that the solution of equation (23), denoted as $(x_{0,q}, x_{1,q}, \ldots, x_{nx,q}, y_0, y_{1,q}, \ldots, y_{ny,q})$, has an isomorphic solution that satisfies equation (24), denoted as $$\left( g x_{0,q}, g x_{1,q}, \ldots, g x_{nx,q}, g^{\frac{3}{2}} y_0, g^{\frac{3}{2}} y_{1,q}, \ldots, g^{\frac{3}{2}} y_{ny,q} \right).$$

The solutions of equation (23) form the points $(x_{0,q}, x_{1,q}, \ldots, x_{nx,q}, y_0, y_{1,q}, \ldots, y_{ny,q})$ that satisfy an elliptic polynomial. Similarly, the solutions of equation (24) form the points $$\left( g x_{0,q}, g x_{1,q}, \ldots, g x_{nx,q}, g^{\frac{3}{2}} y_0, g^{\frac{3}{2}} y_{1,q}, \ldots, g^{\frac{3}{2}} y_{ny,q} \right).$$

that satisfy its twist. This proves the above theorem.

An example of a mapping of the solutions of equation (23) defined over F(p), where p=3mod 4, to the solutions of its twist is implemented by using $-x_i$ for the x-coordinates and $-y_i^2$ for the y-coordinates.

The isomorphism between an elliptic polynomial and its twist, discussed above, is exploited for the embedding of the bit sting of a shared secret key into the appropriate x and y coordinates of an elliptic polynomial point without the need for an iterative search for a quadratic residue value of the corresponding $y_0$-coordinate, which usually requires several iterations, where the number of iterations needed is different for different bit strings which are being embedded.

Assuming F=F(p) and that the secret key is an M-bit string such that (nx+ny+1)N>M>N−1, where N is the number of bits needed to represent the elements of F(p), then the secret key bit string is divided into (nx+ny+1) bit-strings $k_{x,0}, k_{x,1}, \ldots, k_{x,nx}, k_{y,1}, \ldots, k_{y,ny}$. The value of the bit-strings $k_{x,0}, k_{x,1}, \ldots, k_{x,nx}, k_{y,1}, \ldots, k_{y,ny}$ must be less than p. In the preferred embodiment of embedding the (nx+ny+1) bit-strings $k_{x,0}, k_{x,1}, \ldots, k_{x,nx}, k_{y,1}, \ldots, k_{y,ny}$, the embedding is as follows.

First, assign the value of the bit string of $k_{x,0}, k_{x,1}, \ldots, k_{x,nx}$ to $x_{0,k}, x_{1,k}, \ldots, x_{nx,k}$. Next, assign the value of the bit string of $k_{y,1}, \ldots, k_{y,ny}$ to $y_{1,k}, \ldots, y_{ny,k}$. Then, compute:

$$T = -\sum_{i \in S_{ny}} a_{1i} y_{i,k}^2 - \sum_{i,l \in S_{ny}, l \neq i} a_{2il} y_{i,k} y_{l,k} + \sum_{l \in S_{nx}} b_{1l} x_{l,k}^3 + \sum_{l,i \in S_{nx}, l \neq i} b_{2li} x_{l,k}^2 x_{i,k}.$$

Finally, use the Legendre test to see if T has a square root. If T has a square root, assign one of the roots to $y_0$; otherwise, the x-coordinates and y-coordinates of the elliptic polynomial point with the embedded shared secret key bit string are given by $gx_{i,k}$ and $$g^{\frac{3}{2}} y_{i,k},$$

respectively.

It should be noted that p is usually predetermined prior to encryption, so that the value of g can also be predetermined. Further, the receiver can identify whether the point $(x_{0,k}, x_{1,k}, \ldots, x_{nx,k}, y_{0,k}, y_{1,k}, \ldots, y_{ny,k})$ or the point $$\left(gx_{0,k}, gx_{1,k}, \ldots, gx_{nx,k}, g^{\frac{3}{2}} y_{0,k}, g^{\frac{3}{2}} y_{1,k}, \ldots, g^{\frac{3}{2}} y_{ny,k}\right)$$

is the elliptic polynomial point with the embedded secret key bit strings without any additional information. Additionally, any non-quadratic value in F(p) can be used for g. For efficiency, g is chosen to be −1 for p≡3mod4 and g is chosen to be 2 for p≡1mod4.

The same deterministic and non-iterative method described above can be used to embed a secret message bit string into an elliptic polynomial point in a deterministic and non-iterative manner. Assuming F=F(p) and that the message is an M-bit string such that (nx+ny+1)N>M>N−1, where N is the number of bits needed to represent the elements of F(p), then the message bit string is divided into (nx+ny+1) bit-strings $m_{x,0}, m_{x,1}, \ldots, m_{x,nx}, m_{y,1}, \ldots, m_{k,ny}$. The value of the bit-strings $m_{x,0}, m_{x,1}, \ldots, m_{x,nx}, m_{y,1}, \ldots, m_{k,ny}$ must be less than p. As in the previous embodiment, the embedding of the (nx+ny+1) bit-strings $m_{x,0}, m_{x,1}, \ldots, m_{x,nx}, m_{y,1}, \ldots, m_{k,ny}$ can be accomplished out as follows.

First, assign the value of the bit string of $m_{x,0}, m_{x,1}, \ldots, m_{x,nx}$ to $x_{0,m}, x_{1,m}, \ldots, x_{nx,m}$. Next, assign the value of the bit string of $m_{y,1}, \ldots, m_{k,ny}$ to $y_{1,m}, \ldots, y_{ny,m}$. Then compute:

$$T = -\sum_{i \in S_{ny}} a_{1i} y_{i,m}^2 - \sum_{i,l \in S_{ny}, l \neq i} a_{2il} y_{i,m} y_{l,m} + \sum_{l \in S_{nx}} b_{1l} x_{l,m}^3 + \sum_{l,i \in S_{nx}, l \neq i} b_{2li} x_{l,m}^2 x_{i,m}.$$

Finally, use the Legendre test to see if T has a square root. If T has a square root, then assign one of the roots to $y_0$, otherwise the x-coordinates and y-coordinates of the elliptic polynomial point with the embedded shared secret key bit string are given by $gx_{i,m}$ and $$g^{\frac{3}{2}} y_{i,m},$$

respectively.

It should be noted that p is usually predetermined prior to encryption; thus, the value of g can also be predetermined. Further, when using the above method, the strings and $m_{x,0}, m_{x,1}, \ldots, m_{x,nx}$ and $m_{y,1}, \ldots, m_{k,ny}$ can be recovered directly from $x_{0,m}, x_{1,m}, \ldots, x_{nx,m}$ and $y_{1,m}, \ldots, y_{ny,m}$, respectively. An extra bit is needed to identify whether $(x_{0,m}, x_{1,m}, \ldots, x_{nx,m}, y_{0,m}, y_{1,m}, \ldots, y_{ny,m})$ or $$\left(gx_{0,m}, gx_{1,m}, \ldots, gx_{nx,m}, g^{\frac{3}{2}} y_{0,m}, g^{\frac{3}{2}} y_{1,m}, \ldots, g^{\frac{3}{2}} y_{ny,m}\right)$$

is used at the sending correspondent. Additionally, any non-quadratic value in F(p) can be used for g. For efficiency, g is chosen to be −1 for p≡3mod4 and is chosen to be 2 for p≡1mod4. Further, at the receiver, the process is reversed. In the case of g=2, a division by two is carried out. It should noted that dividing $x_{i,m}$ by two is computed using one modulo addition, because:

$$x_{i,m}/2 = ((x_{i,m} - (x_{i,m}) \bmod 2)/2) + (x_{i,m}) \bmod 2 * (1/2) \bmod p; \quad (i)$$

$$(x_{i,m}) \bmod 2 \text{ is the least significant bit of } x_{i,m}; \quad (ii) \text{ and}$$

$$(1/2) \bmod p = (p+1)/2. \quad (iii)$$

The following describes the mapping of points that satisfy one elliptic polynomial to points that satisfy another elliptic polynomial. The two elliptic polynomials are not required to be isomorphic with respect to each other. This mapping is used for "hopping" between elliptic polynomials.

The type of elliptic polynomial used for such mapping of points has the following form. The elliptic polynomial is a polynomial with more than two independent variables such that one of the variables, termed the y-coordinate, has a maximum degree of two, and appears on its own in only one of the monomials. The other variables, termed the x-coordinates, have a maximum degree of three, and each must appear in at least one of the monomials with a degree of three. Finally, all monomials that contain x-coordinates must have a total degree of three.

Letting $S_{nx}$ represent the set of numbers from 0 to nx (i.e., $S_{nx} = \{0, \ldots, nx\}$), then given a finite field F and denoting $b_{1l}^{(s)}, b_{2lk}^{(s)} \in F$ as the coefficients of the s-th elliptic polynomial, the following equation defined over F is an example of such an elliptic polynomial:

$$y^2 = \sum_{l \in S_{nx}} b_{1l}^{(s)} x_l^3 + \sum_{l,k \in S_{nx}, l \neq k} b_{2lk}^{(s)} x_l^2 x_k. \quad (25)$$

The following equations are examples of equation (25):

$$y^2 = b_{10}^{(s)} x_0^3 + b_{11}^{(s)} x_1^3 + b_{201}^{(s)} x_0^2 x_1 \quad (26)$$

$$y_0^2 = b_{10}^{(s)} x_0^3 + b_{11}^{(s)} x_1^3 + b_{201}^{(s)} x_0^2 x_1 + b_{210}^{(s)} x_1^2 x_0 \quad (27).$$

Given an elliptic polynomial, such as that given above in equation (25), with coefficients $b_{1l}, b_{2lk1} \in F$, then) $(x_{0,o}^{(s)}, x_{0,o}^{(s)}, \ldots, x_{nx,o}^{(s)}, y_o^{(s)})$ is denoted as a point that satisfies the s-th elliptic polynomial. Given another elliptic polynomial that is denoted the r-th polynomial, with coefficients $b_{1l}^{(r)}, b_{2lk}^{(r)} \in F$, then $$y^2 = \sum_{l \in S_{nx}} b_{1l}^{(r)} x_l^3 + \sum_{l,k \in S_{nx}, l \neq k} b_{2lk}^{(r)} x_l^2 x_k,$$

where the r-th elliptic polynomial is not necessarily isomorphic to the s-th elliptic polynomial, i.e., where all or some of the coefficients $b_{1l}^{(r)}, b_{2lk}^{(r)} \in F$ are different and independent of the coefficients $b_{1l}^{(s)}, b_{2lk}^{(s)} \in F$.

Elliptic polynomial hopping refers to hopping the point $(x_{0,o}^{(s)}, x_{0,o}^{(s)}, \ldots, x_{nx,o}^{(s)}, y_o^{(s)})$ that satisfies the one elliptic polynomial (for example, the s-th elliptic polynomial with coefficients $b_{1l}^{(s)}, b_{2lk}^{(s)} \in F$) into an equivalent point $(x_{0,o}^{(r)}, x_{0,o}^{(r)}, \ldots, x_{nx,o}^{(r)}, y_o^{(r)})$ that satisfies the r-th elliptic polynomial with coefficients $b_{1l}^{(r)}, b_{2lk}^{(r)} \in F$.

One method of achieving this is as follows. First, set the x-coordinates of the hopped point $x_{0,o}^{(r)}, x_{1,o}^{(r)}, \ldots, x_{nx,o}^{(r)}$ to the x-coordinates $x_{0,o}^{(s)}, x_{1,o}^{(s)}, \ldots, x_{nx,o}^{(s)}$ of the original point, $x_{i,o}^{(r)} = x_{i,o}^{(s)}$ for $i = 0, \ldots, nx$. Next, substitute the value of the x-coordinates $x_{0,o}^{(r)}, x_{1,o}^{(r)}, \ldots, x_{nx,o}^{(r)}$ into the new elliptic polynomial equation to obtain $$T^{(r)} = \sum_{l \in S_{nx}} b_{1l}^{(r)} (x_l^{(r)})^3 + \sum_{l,k \in S_{nx}, l \neq k} b_{2lk}^{(r)} (x_l^{(r)})^2 x_k^{(r)}$$

(any value of $x_{0,o}^{(r)}, x_{1,o}^{(r)}, \ldots, x_{nx,o}^{(r)}$ of will lead to a value of $T^{(r)} \in F(p)$, where $T^{(r)}$ could be quadratic residue or non-quadratic residue). Finally, if $T^{(r)}$ is quadratic residue, set $y_o^{(r)} = \sqrt{T^{(r)}}$ and the hopped point is given by $(x_{0,o}^{(r)}, x_{1,o}^{(r)}, \ldots, x_{nx,o}^{(r)}, y_o^{(r)})$; otherwise, if $T^{(r)}$ is a non-quadratic residue, set $y_{0,o}^{(r)} = \sqrt{g^3 T^{(r)}}$ and the hopped point is given by $(gx_{0,o}^{(r)}, gx_{1,o}^{(r)}, \ldots, gx_{nx,o}^{(r)}, y_{0,o}^{(r)})$.

Thus, any point that satisfies an elliptic polynomial can be hopped to an equivalent point on another elliptic polynomial, even if the two polynomials are not isomorphic to each other.

Further, a point is never mapped to another point that satisfies the twist of another elliptic polynomial. As can be seen in the final step above, a point that satisfies an elliptic polynomial is mapped (hopped) to another point that satisfies another elliptic polynomial. Any point that satisfies one elliptic polynomial can be uniquely mapped to another point that satisfies either the equation of an elliptic polynomial or the equation of its twist. In order to show this unique mapping, an additional "-tuple" must be used to indicate as to whether a point that satisfies an elliptic polynomial is mapped to point on another elliptic polynomial or the twist of this other elliptic polynomial.

Thus, for purposes of point mapping between one elliptic polynomial into another, a point is represented as $(x_{0,o}^{(s)}, x_{1,o}^{(s)}, \ldots, x_{nx,o}^{(s)}, y_o^{(s)}, \alpha_o^{(s)})$. The last variable, $\alpha_o^{(s)}$, indicates whether the point $(x_{0,o}^{(s-1)}, x_{1,o}^{(s-1)}, \ldots, x_{nx,o}^{(s-1)}, y_o^{(s-1)}, \alpha_o^{(s-1)})$ that satisfies the previous elliptic polynomial was mapped to an elliptic polynomial or its twist. If $\alpha_o^{(s)} = 1$, the point $(x_{0,o}^{(s-1)}, x_{1,o}^{(s-1)}, \ldots, x_{nx,o}^{(s-1)}, y_o^{(s-1)}, \alpha_o^{(s-1)})$ was originally mapped to a point on the elliptic polynomial, otherwise if $\alpha_o^{(s)} = 0$, the point $(x_{0,o}^{(s-1)}, x_{1,o}^{(s-1)}, \ldots, x_{nx,o}^{(s-1)}, y_o^{(s-1)}, \alpha_o^{(s-1)})$ was mapped to a point on the twist of an elliptic polynomial. The addition of the variable $\alpha^{(s)}$ as an extra "-tuple" in the representation of points allows the above procedure to be reversed as follows.

First, if $\alpha_o^{(s)} = 1$, the x-coordinates $x_{0,o}^{(s-1)}, x_{1,o}^{(s-1)}, \ldots, x_{nx,o}^{(s-1)}$ are given by $x_{i,o}^{(s-1)} = x_{i,o}^{(s)}$ for $i = 0, \ldots, nx$; otherwise, if $\alpha_o^{(s)} = 0, \ldots, nx$; the x-coordinates $x_{0,o}^{(s-1)}, x_{1,o}^{(s-1)}, \ldots, x_{nx,o}^{(s-1)}$ are given by $x_{i,o}^{(s-1)} = g x_{i,o}^{(s)}$ for $i = 0, \ldots, nx$. Next substitute the value of the x-coordinates $x_{0,o}^{(s-1)}, x_{1,o}^{(s-1)}, \ldots, x_{nx,o}^{(s-1)}$ into the (s-1) elliptic polynomial equation to obtain $$T^{(s-1)} = \sum_{l \in S_{nx}} b_{1l}^{(s-1)} (x_l^{(s-1)})^3 + \sum_{l,k \in S_{nx}, l \neq k} b_{2lk}^{(s-1)} (x_l^{(s-1)})^2 x_k^{(s-1)}.$$

Finally, compute $y_o^{(s-1)} = \sqrt{T^{(s-1)}}$, since it is known that the original point $(x_{0,o}^{(s-1)}, x_{1,o}^{(s-1)}, \ldots, x_{nx,o}^{(s-1)}, y_o^{(s-1)}, \alpha_o^{(s-1)})$ must satisfy the equation of an elliptic polynomial. Thus, $T^{(s-1)}$ is always a quadratic residue.

It should be noted that in the above procedures, the value of $\alpha_o^{(s-1)}$ is not defined, since the value depends on the mapping of the point that satisfies the (s-2) elliptic polynomial into the (s-1) elliptic polynomial. This value of $\alpha_o^{(s-1)}$ must be provided as additional information.

The following elliptic polynomial cryptography-based hash functions are based on the elliptic polynomial hopping described above. In the following, it is, assumed that the maximum block size that can be embedded into an elliptic polynomial is N, and that the message data bit string length is a multiple of N, such as uN, i.e., the number of blocks is u.

In a first protocol, the underlying finite field, the number of x-coordinates, and the monomials used are fixed throughout the protocol:

1) a form of an elliptic polynomial equation, such as that described above, by deciding on the underlying finite field F, the number of x-coordinates, and the monomials used, wherein all of this information is further made public;

2) a random number, $k_0$, that will kept a secret key for the used hash function;

3) selection of a random number generator, which is made public;

4) a random number, $kp_0 = 0$, that will be made public or selectively kept secret;

5) generation from $kp_0$ and using a publicly known method, all or some of the coefficients $b_{1l}^{(0)}, b_{2lk}^{(0)} \in F$ to be used in the chosen elliptic polynomial form in generating the hash of the 0-th block using $kp_0 = 0$;

6) an initial base point $(x_{0,B}^{(0)}, x_{1,B}^{(0)}, \ldots, x_{nx,B}^{(0)}, y_B^{(0)}, \alpha_B)$ for the selected polynomial, which is made public; and 7) computing the scalar multiplication of the 0-th block shared key $k_0$ with the base point $(x_{0,B}^{(0)}, x_{1,B}^{(0)}, \ldots, x_{nx,B}^{(0)}, y_B^{(0)}, \alpha_B)$ to obtain $(x_{0,kB}^{(0)}, x_{1,kB}^{(0)}, \ldots, x_{nx,kB}^{(0)}, y_{kB}^{(0)}, 1) = k(x_{0,B}^{(0)}, x_{1,B}^{(0)}, \ldots, x_{nx,B}^{(0)}, y_B^{(0)}, \alpha_B)$, which is made public.

Further, the following steps are implemented:

8) embedding the 0-th block of the message bit string into an elliptic polynomial message point $(x_{0,m}^{(0)}, x_{1,m}^{(0)}, \ldots, x_{nx,m}^{(0)}, y_m^{(0)}, \alpha_m^{(0)})$ using any of the methods described above;

9) the hash point of the 0-th data block $(x_{0,c}^{(0)}, x_{1,c}^{(0)}, \ldots, x_{nx,c}^{(0)}, y_c^{(0)}, \alpha_c^{(0)})$ is computed using: $(x_{0,c}^{(0)}, x_{1,c}^{(0)}, \ldots, x_{nx,c}^{(0)}, y_c^{(0)}, \alpha_c^{(0)}) = (x_{0,m}^{(0)}, x_{1,m}^{(0)}, \ldots, x_{nx,m}^{(0)}, y_m^{(0)}, \alpha_m^{(0)}) + (x_{0,kB}^{(0)}, x_{1,kB}^{(0)}, \ldots, x_{nx,kB}^{(0)}, y_{kB}^{(0)}, 1)$, where $\alpha_c^{(0)} = \alpha_m^{(0)}$, and for $j = 1, \ldots, u$ repeat the following steps 10) to 14):

10) using $kp_{j-1}$ and the random number generator to generate a new random number $kp_j$;

11) generating all or some of the coefficients $b_{1l}^{(j)}, b_{2lk}^{(j)} \in F$ of the j-th elliptic polynomial from the random number $kp_j$;

12) embedding the j-th block of the message bit string into a j-th elliptic polynomial message point $(x_{0,m}^{(j)}, x_{1,m}^{(j)}, \ldots, x_{nx,m}^{(j)}, y_m^{(j)}, \alpha_m^{(j)})$ using any of the above methods;

13) hopping the hash point $(x_{0,c}^{(j-1)}, x_{1,c}^{(j-1)}, \ldots, x_{nx,c}^{(j-1)}, y_c^{(j-1)}, \alpha_c^{(j-1)})$ to an equivalent hash point $(x'_{0,c}^{(j)}, x'_{1,c}^{(j)}, \ldots, x'_{nx,c}^{(j)}, y'_c^{(j)}, \alpha'_c^{(j)})$ that satisfy the j-th elliptic polynomial selected in step 12) using any of the above methods;

14) the hash point of the j-th data block $(x_{0,c}^{(j)}, x_{1,c}^{(j)}, \ldots, x_{nx,c}^{(j)}, y_c^{(j)}, \alpha_c^{(j)})$ is computed using $(x_{0,c}^{(j)}, x_{1,c}^{(j)}, \ldots, x_{nx,c}^{(j)}, y_c^{(j)}, \alpha_c^{(j)}) = (x_{0,m}^{(j)}, x_{1,m}^{(j)}, \ldots, x_{nx,m}^{(j)}, y_m^{(j)}, \alpha_m^{(j)}) + (x'_{0,c}^{(j)}, x'_{1,c}^{(j)}, \ldots, x'_{nx,c}^{(j)}, y'_c^{(j)}, \alpha'_c^{(j)})$, where $\alpha_c^{(j)} = $ Exclusive-OR$(\alpha_m^{(j)}, \alpha'_c^{(j)})$; and 15) the appropriate bits of the x-coordinates, and a bit indicating the value of $\alpha_c^{(u)}$ of the cipher point $(x_{0,c}^{(u)}, x_{1,c}^{(u)}, \ldots, x_{nx,c}^{(u)}, y_c^{(u)}, \alpha_c^{(j)})$ are concatenated together to form the hash bit string.

Further, the following steps are then implemented:

16) embedding the 0-th block of the received message bit string into an elliptic polynomial message point $(x_{0,rm}^{(0)}, x_{1,rm}^{(0)}, \ldots, x_{nx,rm}^{(0)}, y_{rm}^{(0)}, \alpha_{rm}^{(0)})$ using any of the above methods;

17) the hash point of the 0-th received data block) $(x_{0,rc}^{(0)}, x_{1,rc}^{(0)}, \ldots, x_{nx,rc}^{(0)}, y_{rc}^{(0)}, \alpha_{rc}^{(0)})$ is computed by $(x_{0,rc}^{(0)}, x_{1,rc}^{(0)}, \ldots, x_{nx,rc}^{(0)}, y_{rc}^{(0)}, \alpha_{rc}^{(0)}) = (x_{0,rm}^{(0)}, x_{1,rm}^{(0)}, \ldots, x_{nx,rm}^{(0)}, y_{rm}^{(0)}, \alpha_{rm}^{(0)}) + (x_{0,kB}^{(0)}, x_{1,kB}^{(0)}, \ldots, x_{nx,kB}^{(0)}, y_{kB}^{(0)}, 1)$, where $\alpha_c^{(0)} = \alpha_{rm}^{(0)}$, and for j=1, ..., u, repeat the following steps 18) to 22):

18) using $kp_{j-1}$ and the random number generator to generate a new random number $kp_j$;

19) generating all or some of the coefficients $b_{1l}^{(j)}, b_{2lk}^{(j)} \in F$ of the j-th elliptic polynomial from the random number $kp_j$;

20) embedding the j-th block of the received message bit string into a j-th elliptic polynomial message point $(x_{0,rm}^{(j)}, x_{1,rm}^{(j)}, \ldots, x_{nx,rm}^{(j)}, y_{rm}^{(j)}, \alpha_{rm}^{(j)})$ using any of the above methods;

21) hopping the hash point $(x_{0,rc}^{(j-1)}, x_{1,rc}^{(j-1)}, \ldots, x_{nx,rc}^{(j-1)}, y_{rc}^{(j-1)}, \alpha_{rc}^{(j-1)})$ to an equivalent hash point $(x'_{0,rc}^{(j)}, x'_{1,rc}^{(j)}, \ldots, x'_{nx,rc}^{(j)}, y'_{rc}^{(j)}, \alpha'_{rc}^{(j)})$ that satisfies the j-th elliptic polynomial selected in step 12) using any of the above methods;

22) the hash point of the j-th received data block $(x_{0,rc}^{(j)}, x_{1,rc}^{(j)}, \ldots, x_{nx,rc}^{(j)}, y_{rc}^{(j)}, \alpha_{rc}^{(j)})$ is computed by $(x_{0,rc}^{(j)}, x_{1,rc}^{(j)}, \ldots, x_{nx,rc}^{(j)}, y_{rc}^{(j)}, \alpha_{rc}^{(j)}) = (x_{0,rm}^{(j)}, x_{1,rm}^{(j)}, \ldots, x_{nx,rm}^{(j)}, y_{rm}^{(j)}, \alpha_{rm}^{(j)}) + (x'_{0,rc}^{(j)}, x'_{1,rc}^{(j)}, \ldots, x'_{nx,rc}^{(j)}, y'_{rc}^{(j)}, \alpha'_{rc}^{(j)})$;

23) the appropriate bits of the x-coordinates and a bit indicating the value of $\alpha_c^{(u)}$ of the hash point $(x_{0,rc}^{(u)}, x_{1,rc}^{(u)}, \ldots, x_{nx,rc}^{(u)}, y_{rc}^{(u)}, \alpha_{rc}^{(j)})$ are concatenated together to form the hash bit string of the received message data; and 24) if the hash bit string of the received massage data is the same as the hash bit string sent by the sending correspondent, the message hash is accepted as accurate, otherwise it is not.

In an alternative embodiment, a set of elliptic polynomial form is selected for a particular finite field where each form specifies the number of x-coordinates and the monomials and where all this information is made public. In this embodiment, the ciphertext must the same block size. The hash function block size is determined by the maximum block that can be hashed by the defined elliptic polynomial equations. If certain elliptic equations result in hash block sizes that are smaller than the specified size of the hash function, padding is used to maintain uniform block size.

The hash function is then generated as follows:

1) Selection of a set of forms of an elliptic polynomial equation, such as that described above, where each element of the set is specified by the underlying finite field F, the number of x-coordinates and the monomials used, and where all this information is made public;

2) a random number generator;

3) selection of a random number generator, which is made public;

4) selection of an elliptic polynomial form from the publicly known set of general form equation as specified above using the random number of the 0-th block, $kp_0$ and using a publicly known algorithm;

5) an initial base point $(x_{0,B}^{(0)}, x_{1,B}^{(0)}, \ldots, x_{nx,B}^{(0)}, y_B^{(0)}, \alpha_B)$ for the selected polynomial, which is made public; and 6) computing the scalar multiplication of the 0-th block shared key $k_0$ with the base point $(x_{0,B}^{(0)}, x_{1,B}^{(0)}, \ldots, x_{nx,B}^{(0)}, y_B^{(0)}, \alpha_B)$ to obtain $(x_{0,kB}^{(0)}, x_{1,kB}^{(0)}, \ldots, x_{nx,kB}^{(0)}, y_{kB}^{(0)}, 1) = k(x_{0,B}^{(0)}, x_{1,B}^{(0)}, \ldots, x_{nx,B}^{(0)}, y_B^{(0)}, \alpha_B)$, which is made public.

The following steps are then implemented:

7) embedding the 0-th block of the message bit string into an elliptic polynomial message point $(x_{0,m}^{(0)}, x_{1,m}^{(0)}, \ldots, x_{nx,m}^{(0)}, y_m^{(0)}, \alpha_m^{(0)})$ using any of the methods described above;

8) the hash point of the 0-th data block $(x_{0,c}^{(0)}, x_{1,c}^{(0)}, \ldots, x_{nx,c}^{(0)}, y_c^{(0)}, \alpha_c^{(0)})$ is computed using: $(x_{0,c}^{(0)}, x_{1,c}^{(0)}, \ldots, x_{nx,c}^{(0)}, y_c^{(0)}, \alpha_c^{(0)}) = (x_{0,m}^{(0)}, x_{1,m}^{(0)}, \ldots, x_{nx,m}^{(0)}, y_m^{(0)}, \alpha_m^{(0)}) + (x_{0,kB}^{(0)}, x_{1,kB}^{(0)}, \ldots, x_{nx,kB}^{(0)}, y_{kB}^{(0)}, 1)$, where $\alpha_c^{(0)} = \alpha_m^{(0)}$, and for j=1, ..., u repeat the following steps 9) to 15);

9) using $kp_{j-1}$ and the random number generator to generate a new random number $kp_j$ of the j-th block;

10) selecting an elliptic polynomial form from the selected set to be used for the j-th message block, using $kp_j=0$ and a publicly known algorithm;

11) generation from $kp_j$ and using a publicly known method all or some of the coefficients $b_{1l}^{(j)}, b_{2lk}^{(j)} \in F$ to be used in the chosen elliptic polynomial form in generating the hash of the j-th block;

12) embedding the j-th block of the message bit string into a j-th elliptic polynomial message point $(x_{0,m}^{(j)}, x_{1,m}^{(j)}, \ldots, x_{nx,m}^{(j)}, y_m^{(j)}, \alpha_m^{(j)})$ using any of the above methods;

13) hopping the hash point $(x_{0,c}^{(j-1)}, x_{1,c}^{(j-1)}, \ldots, x_{nx,c}^{(j-1)}, y_c^{(j-1)}, \alpha_c^{(j-1)})$ to an equivalent hash point $(x'_{0,c}^{(j)}, x'_{1,c}^{(j)}, \ldots, x'_{nx,c}^{(j)}, y'_c^{(j)}, \alpha'_c^{(j)})$ that satisfies the j-th elliptic polynomial selected in step 12) using any of the above methods;

14) the hash point of the j-th data block $(x_{0,c}^{(j)}, x_{1,c}^{(j)}, \ldots, x_{nx,c}^{(j)}, y_c^{(j)}, \alpha_c^{(j)})$ is computed using $(x_{0,c}^{(j)}, x_{1,c}^{(j)}, \ldots, x_{nx,c}^{(j)}, y_c^{(j)}, \alpha_c^{(j)}) = (x_{0,m}^{(j)}, x_{1,m}^{(j)}, \ldots, x_{nx,m}^{(j)}, y_m^{(j)}, \alpha_m^{(j)}) + (x'_{0,c}^{(j)}, x'_{1,c}^{(j)}, \ldots, x'_{nx,c}^{(j)}, y'_c^{(j)}, \alpha'_c^{(j)})$, where $\alpha_c^{(j)} = $ Exclusive-OR$(\alpha_m^{(j)}, \alpha'_c^{(j)})$; and 15) the appropriate bits of the x-coordinates, and a bit indicating the value of $\alpha_c^{(u)}$ of the cipher point $(x_{0,c}^{(u)}, x_{1,c}^{(u)}, \ldots, x_{nx,c}^{(u)}, y_c^{(u)}, \alpha_c^{(u)})$ are concatenated together to form the hash bit string.

The Legendre Symbol is used to test whether an element of F(p) has a square root or not, i.e., whether an element is quadratic residue or not. The Legendre Symbol and test are as follows. Given an element of a finite field F(p), such as d, the Legendre symbol is defined as $\left(\frac{d}{p}\right).$ In order to test whether d is quadratic residue or not, the Legendre symbol, $\left(\frac{d}{p}\right),$ is computed such that $$\left(\frac{d}{p}\right) = \begin{cases} +1 & \text{if } x \text{ is quadratic residue} \\ 0 & \text{if } x \equiv 0 \bmod F(p) \\ -1 & \text{otherwise.} \end{cases}$$

Security of the hash functions depends on the security of the underlying elliptic polynomial cryptography. The security of elliptic polynomial cryptosystems is assessed by both the effect on the solution of the elliptic polynomial discrete logarithmic problem (ECDLP) and power analysis attacks.

It is well known that the elliptic polynomial discrete logarithm problem (ECDLP) is apparently intractable for non-singular elliptic polynomials. The ECDLP problem can be stated as follows: given an elliptic polynomial defined over F that needs N-bits for the representation of its elements, an elliptic polynomial point $(x_P, y_P) \in EC$, defined in affine coordinates, and a point $(x_Q, y_Q) \in EC$, defined in affine coordinates, determine the integer $k, 0 \leq k \leq \# F$, such that $(x_Q, y_Q) = k(x_P, y_P)$, provided that such an integer exists. In the below, it is assumed that such an integer exists.

The most well known attack used against the ECDLP is the Pollard ρ-method, which has a complexity of $O(\sqrt{\pi K}/2)$, where K is the order of the underlying group, and the complexity is measured in terms of an elliptic polynomial point addition.

Since the underlying cryptographic problems used in the above block cipher chaining methods is the discrete logarithm problem, which is a known difficult mathematical problem, it is expected that the security of the above methods are more secure than prior art ciphers which are not based on such a mathematically difficult problem.

It will be understood that the hash functions with elliptic polynomial hopping described above may be implemented by software stored on a medium readable by a computer and executing as set of instructions on a processor (including a microprocessor, microcontroller, or the like) when loaded into main memory in order to carry out a cryptographic system of secure communications in a computer network. As used herein, a medium readable by a computer includes any form of magnetic, optical, mechanical, laser, or other media readable by a computer, including floppy disks, hard disks, compact disks (CDs), digital versatile disk (DVD), laser disk, magnetic tape, paper tape, punch cards, flash memory, etc.

It is to be understood that the present invention, is not limited to the embodiments described above, but encompasses any and all embodiments within the scope of the following claims.

We claim:

1. A method of generating hash functions for elliptic polynomial cryptography with elliptic polynomial hopping, comprising the steps of:

establishing:

a) a form of an elliptic polynomial equation by deciding on an underlying finite field F, a number of x-coordinates, and a set of monomials used, wherein this information is made public;

b) a random number $k_0$, which is kept as a secret key for a hash function to be used;

c) selection of a random number generator, which is made public;

d) a random number $kp_0$ which is made public;

e) generation from $kp_0$ and using a publicly known method at least a portion of the coefficients $b_{1l}^{(0)}, b_{2lk}^{(0)} \in F$ to be used in the chosen elliptic polynomial form in generating the hash of the 0-th block;

f) an initial base point $(x_{0,B}^{(0)}, x_{1,B}^{(0)}, \ldots, x_{nx,B}^{(0)}, y_B^{(0)}, \alpha_B)$ for the selected polynomial, which is made public; and g) a computed scalar multiplication of the 0-th block shared key $k_0$ with a base point $(x_{0,B}^{(0)}, x_{1,B}^{(0)}, \ldots, x_{nx,B}^{(0)}, y_B^{(0)}, \alpha_B)$ to obtain $(x_{0,kB}^{(0)}, x_{1,kB}^{(0)}, \ldots, x_{nx,kB}^{(0)}, y_{kB}^{(0)}, 1) = k(x_{0,B}^{(0)}, x_{1,B}^{(0)}, \ldots, x_{nx,B}^{(0)}, y_B^{(0)}, \alpha_B)$, which is made public;)

h) embedding the 0-th block into an elliptic polynomial message point) $(x_{0,m}^{(0)}, x_{1,m}^{(0)}, \ldots, x_{nx,m}^{(0)}, y_m^{(0)}, \alpha_m^{(0)})$;

i) the hash point of the 0-th data block $(x_{0,c}^{(0)}, x_{1,c}^{(0)}, \ldots, x_{nx,c}^{(0)}, y_c^{(0)}, \alpha_c^{(0)})$ is computed using $(x_{0,c}^{(0)}, x_{1,c}^{(0)}, \ldots, x_{nx,c}^{(0)}, y_c^{(0)}, \alpha_c^{(0)}) = (x_{0,m}^{(0)}, x_{1,m}^{(0)}, \ldots, x_{nx,m}^{(0)}, y_m^{(0)}, \alpha_m^{(0)}) + (x_{0,kB}^{(0)}, x_{1,kB}^{(0)}, \ldots, x_{nx,kB}^{(0)}, y_{kB}^{(0)}, 1)$, where $\alpha_c^{(0)} = \alpha_m^{(0)}$, and for $j=1$, repeating the following steps j) through n), and incrementing j at each step until all of the message data blocks are processed;

j) using $kp_{j-1}$ and the random number generator to generate a new random number $kp_j$;

k) generating at least some of the coefficients $b_{1l}^{(j)}, b_{2lk}^{(j)} \in F$ of a j-th elliptic polynomial from the random number $kp_j$;

l) embedding a j-th block of the message bit string into a j-th elliptic polynomial message point $(x_{0,m}^{(j)}, x_{1,m}^{(j)}, \ldots, x_{nx,m}^{(j)}, y_m^{(j)}, \alpha_m^{(j)})$;

m) hopping the hash point $(x_{0,c}^{(j-1)}, x_{1,c}^{(j-1)}, \ldots, x_{nx,c}^{(j-1)}, y_c^{(j-1)}, \alpha_c^{(j-1)})$ to an equivalent hash point $(x'_{0,c}^{(j)}, x'_{1,c}^{(j)}, \ldots, x'_{nx,c}^{(j)}, y'_c^{(j)}, \alpha'_c^{(j)})$ that satisfies the j-th elliptic polynomial selected in step l);

n) computing the hash point of the j-th data block $(x_{0,c}^{(j)}, x_{1,c}^{(j)}, \ldots, x_{nx,c}^{(j)}, y_c^{(j)}, \alpha_c^{(j)})$ using $(x_{0,c}^{(j)}, x_{1,c}^{(j)}, \ldots, x_{nx,c}^{(j)}, y_c^{(j)}, \alpha_c^{(j)}) = (x_{0,m}^{(j)}, x_{1,m}^{(j)}, \ldots, x_{nx,m}^{(j)}, y_m^{(j)}, \alpha_m^{(j)}) + (x'_{0,c}^{(j)}, x'_{1,c}^{(j)}, \ldots, x'_{nx,c}^{(j)}, y'_c^{(j)}, \alpha'_c^{(j)})$, where $\alpha_c^{(j)} = \text{Exclusive-OR}(\alpha_m^{(j)}, \alpha'_c^{(j)})$; and and o) the appropriate bits of the x-coordinates, and a bit indicating the value of $\alpha_c^{(u)}$ of the cipher point $(x_{0,c}^{(u)}, x_{1,c}^{(u)}, \ldots, x_{nx,c}^{(u)}, y_c^{(u)}, \alpha_c^{(j)})$ are concatenated together to form the hash bit string.

2. The method of generating hash functions for elliptic polynomial cryptography with elliptic polynomial hopping as recited in claim 1, wherein the form of the elliptic polynomial equation is selected to be $$y^2 = \sum_{l \in S_{nx}} b_{1l}^{(s)} x_l^3 + \sum_{l,k \in S_{nx}, l \neq k} b_{2lk}^{(s)} x_l^2 x_k.$$

3. The method of generating hash functions for elliptic polynomial cryptography with elliptic polynomial hopping as recited in claim 2, wherein the step of embedding the 0-th block of the message bit string includes the steps of:
   a) dividing the message bit string into (nx+ny+1) bit-strings $m_{x,0}, m_{x,1}, \ldots, m_{x,nx}, m_{y,1}, \ldots, m_{y,ny}$;
   b) assigning the value of the bit string of $m_{x,0}$, $m_{x,1}, \ldots, m_{x,nx}$ to $x_{0,m}, x_{1,m}, \ldots, x_{nx,m}$;
   c) computing $$T^{(s-1)} = \sum_{l \in S_{nx}} b_{1l} x_l^3 + \sum_{l,k \in S_{nx}, l \neq k} b_{2lk} x_l^2 x_k;$$

and
   d) performing a Legendre test to determine if T has a square root, wherein if T has a square root, then assigning the square root to $y_0$, and if T does not have a square root, then the x-coordinates and y-coordinates of the elliptic polynomial point with the embedded shared secret key bit string are selected as $gx_{i,m}$ and $$g^{\frac{3}{2}} y_{i,m},$$

respectively, wherein g is non-quadratic residue in F.

4. The method as recited in claim 3, wherein the step of hashing the hash point includes the steps of:
   a) setting the x-coordinates of a hopped point $x_{0,o}^{(r)}$, $x_{1,o}^{(r)}, \ldots, x_{nx,o}^{(r)}$ to the x-coordinates $x_{0,o}^{(s)}$, $x_{1,o}^{(s)}, \ldots, x_{nx,o}^{(s)}$ of an original point $x_{i,o}^{(r)} = x_{i,o}^{(s)}$ for $i=0, \ldots, nx$;
   b) substituting the value of the x-coordinates $x_{0,o}^{(r)}$, $x_{1,o}^{(r)}, \ldots, x_{nx,o}^{(r)}$ into a new elliptic polynomial equation to obtain $$T^{(r)} = \sum_{l \in S_{nx}} b_{1l}^{(r)} (x_l^{(r)})^3 + \sum_{l,k \in S_{nx}, l \neq k} b_{2lk}^{(r)} (x_l^{(r)})^2 x_k^{(r)},$$

wherein any value of $x_{0,o}^{(r)}, x_{1,o}^{(r)}, \ldots, x_{nx,o}^{(r)}$ leads to a value of; and
   c) if $T^{(r)}$ is quadratic residue, then setting $y_o^{(r)} = \sqrt{T^{(r)}}$ and the hopped point is given by $(x_{0,o}^{(r)}, x_{1,o}^{(r)}, \ldots, x_{nx,o}^{(r)}, y_o^{(r)})$ and if $T^{(r)}$ is non-quadratic residue, then setting $y_{0,o}^{(r)} = \sqrt{g^3 T^{(r)}}$, and the hopped point is given by $(gx_{0,o}^{(r)}, gx_{1,o}^{(r)}, \ldots, gx_{nx,o}^{(r)}, y_{0,o}^{(r)})$.

5. A method of generating hash functions for elliptic polynomial cryptography with elliptic polynomial hopping, comprising the steps of:
   establishing:
   a) form of an elliptic polynomial equation by deciding on an underlying finite field F, a number of x-coordinates, and a set of monomials used, wherein this information is made public;
   b) a random number $k_0$, which is kept as a secret key for a hash function to be used;
   c) selection of a random number generator, which is made public;
   d) a random number $kp_0$ which is made public;
   e) generation from $kp_0$ and using a publicly known method at least a portion of the coefficients $b_{1l}^{(0)}, b_{2lk}^{(0)} \in F$ to be used in the chosen elliptic polynomial form in generating the hash of the 0-th block;
   f) an initial base point $(x_{0,B}^{(0)}, x_{1,B}^{(0)}, \ldots, x_{nx,B}^{(0)}, y_B^{(0)}, \alpha_B)$ for the selected polynomial, which is made public; and
   g) computation of a scalar multiplication of the 0-th block shared key $k_0$ with the base point $(x_{0,B}^{(0)}, x_{1,B}^{(0)}, \ldots, x_{nx,B}^{(0)}, y_B^{(0)}, \alpha_B)$ to obtain $(x_{0,kB}^{(0)}, x_{1,kB}^{(0)}, \ldots, x_{nx,kB}^{(0)}, y_{kB}^{(0)}, 1) = k(x_{0,B}^{(0)}, x_{1,B}^{(0)}, \ldots, x_{nx,B}^{(0)}, y_B^{(0)}, \alpha_B)$, which is made public;
   h) embedding the 0-th block of the message bit string into an elliptic polynomial message point $(x_{0,m}^{(0)}, x_{1,m}^{(0)}, \ldots, x_{nx,m}^{(0)}, y_m^{(0)}, \alpha_m^{(0)})$;
   i) computing a hash point of the 0-th data block $(x_{0,c}^{(0)}, x_{1,c}^{(0)}, \ldots, x_{nx,c}^{(0)}, y_c^{(0)}, \alpha_c^{(0)})$ is using $(x_{0,c}^{(0)}, x_{1,c}^{(0)}, \ldots, x_{nx,c}^{(0)}, y_c^{(0)}, \alpha_c^{(0)}) = (x_{0,m}^{(0)}, x_{1,m}^{(0)}, \ldots, x_{nx,m}^{(0)}, y_m^{(0)}, \alpha_m^{(0)}) + (x_{0,kB}^{(0)}, x_{1,kB}^{(0)}, \ldots, x_{nx,kB}^{(0)}, y_{kB}^{(0)}, 1)$, where $\alpha_c^{(0)} = \alpha_m^{(0)}$, and for $j=1$, repeating the following steps j) through n), and incrementing j at each step until all of the message data blocks are processed;
   j) using $kp_{j-1}$ and the random number generator to generate a new random number $kp_j$ of a j-th block;
   k) selection of an elliptic polynomial form from the selected set by generating its binary code using $kp_j$ and the publicly known method;
   l) generating at least some of the coefficients $b_{1l}^{(j)}, b_{2lk}^{(j)} \in F$ of the j-th elliptic polynomial from the random number $kp_j$;
   m) embedding the j-th block of the message bit string into a j-th th elliptic polynomial message point $(x_{0,m}^{(j)}, x_{1,m}^{(j)}, \ldots, x_{nx,m}^{(j)}, y_m^{(j)}, \alpha_m^{(j)})$;
   n) hopping the hash point $(x_{0,c}^{(j-1)}, x_{1,c}^{(j-1)}, \ldots, x_{nx,c}^{(j-1)}, y_c^{(j-1)}, \alpha_c^{(j-1)})$ to an equivalent hash point $(x'_{0,c}^{(j)}, x'_{1,c}^{(j)}, \ldots, x'_{nx,c}^{(j)}, y'_c^{(j)}, \alpha'_c^{(j)})$ that satisfies the j-th elliptic polynomial selected in step l);
   o) computing the hash point of the j-th data block $(x_{0,c}^{(j)}, x_{1,c}^{(j)}, \ldots, x_{nx,c}^{(j)}, y_c^{(j)}, \alpha_c^{(j)})$ is using $(x_{0,c}^{(j)}, x_{1,c}^{(j)}, \ldots, x_{nx,c}^{(j)}, y_c^{(j)}, \alpha_c^{(j)}) = (x_{0,m}^{(j)}, x_{1,m}^{(j)}, \ldots, x_{nx,m}^{(j)}, y_m^{(j)}, \alpha_m^{(j)}) + (x'_{0,c}^{(j)}, x'_{1,c}^{(j)}, \ldots, x'_{nx,c}^{(j)}, y'_c^{(j)}, \alpha'_c^{(j)})$, where $\alpha_c^{(j)} = \text{Exclusive-OR}(\alpha_m^{(j)}, \alpha'_c^{(j)})$; and and
   p) appropriate bits of the x-coordinates and a bit indicating the value of $\alpha_c^{(u)}$ of the cipher point $(x_{0,c}^{(u)}, x_{1,c}^{(u)}, \ldots, x_{nx,c}^{(u)}, y_c^{(u)}, \alpha_c^{(u)})$ are concatenated together;
   q) embedding the 0-th block of the received message bit string into an elliptic polynomial message point $(x_{0,rm}^{(0)}, x_{1,rm}^{(0)}, \ldots, x_{nx,rm}^{(0)}, y_{rm}^{(0)}, \alpha_{rm}^{(0)})$;
   r) the hash point of the 0-th received data block $(x_{0,rc}^{(0)}, x_{1,rc}^{(0)}, \ldots, x_{nx,rc}^{(0)}, y_{rc}^{(0)}, \alpha_{rc}^{(0)})$ is computed using: $(x_{0,rc}^{(0)}, x_{1,rc}^{(0)}, \ldots, x_{nx,rc}^{(0)}, y_{rc}^{(0)}, \alpha_{rc}^{(0)}) = (x_{0,rm}^{(0)}, x_{1,rm}^{(0)}, \ldots, x_{nx,rm}^{(0)}, y_{rm}^{(0)}, \alpha_{rm}^{(0)}) + (x_{0,kB}^{(0)}, x_{1,kB}^{(0)}, \ldots, x_{nx,kB}^{(0)}, y_{kB}^{(0)}, 1)$, where) $\alpha_{rc}^{(0)} = \alpha_{rm}^{(0)}$, and for $j=1, \ldots, u$ repeat the following steps s) to y):
   s) generating a new random number $kp_j$ using $kp_{j-1}$ and the random number generator;
   t) selecting an elliptic polynomial form from the agreed upon set of general form equations using the shared secret key of the j-th block;
   u) generating all or some of the coefficients $b_{1l}^{(j)}, b_{2lk}^{(j)} \in F$ of the j-th elliptic polynomial from the random number $kp_j$;

v) embedding the j-th block of the received message bit string into a j-th elliptic polynomial message point $(x_{0,rm}^{(j)}, x_{1,rm}^{(j)}, \ldots, x_{nx,rm}^{(j)}, y_{rm}^{(j)}, \alpha_{rm}^{(j)})$;

w) hopping the hash point $(x_{0,rc}^{(j-1)}, x_{1,rc}^{(j-1)}, \ldots, x_{nx,c}^{(j-1)}, y_{rc}^{(j-1)}, \alpha_{rc}^{(j-1)})$ to an equivalent hash point $(x'_{0,rc}^{(j)}, x'_{1,rc}^{(j)}, \ldots, x'_{nx,rc}^{(j)}, y'_{rc}^{(0)}, \alpha'_{rc}^{(j)})$ that satisfies the j-th elliptic polynomial selected in step 1);

x) computing the hash point of the j-th received data block $(x_{0,rc}^{(j)}, x_{1,rc}^{(j)}, \ldots, x_{nx,rc}^{(j)}, y_{rc}^{(j)}, \alpha_{rc}^{(j)})$ is using $(x_{0,rc}^{(j)}, x_{1,rc}^{(j)}, \ldots, x_{nx,rc}^{(j)}, y_{rc}^{(j)}, \alpha_{rc}^{(j)}) = (x_{0,rm}^{(j)}, x_{1,rm}^{(j)}, \ldots, x_{nx,rm}^{(j)}, y_{rm}^{(j)}, \alpha_{rm}^{(j)}) + (x'_{0,rc}^{(j)}, x'_{1,rc}^{(j)}, \ldots, x'_{nx,rc}^{(j)}, y'_{rc}^{(j)}, \alpha'_{rc}^{(j)})$; and y) the appropriate bits of the x-coordinates and a bit indicating the value of $\alpha_c^{(u)}$ of the hash point $(x_{0,rc}^{(u)}, x_{1,rc}^{(u)}, \ldots, x_{nx,rc}^{(u)}, y_{rc}^{(u)}, \alpha_{rc}^{(u)})$ are concatenated together to form the hash bit string of the received message data;

wherein if the hash bit string of the received massage data is the same as the hash bit string sent by the sending correspondent then the message hash is accepted as accurate, and if the hash bit string of the received message data is not the same as the hash bit string sent by the sending correspondent then the message hash is determined to not be accurate.

6. The method of generating hash functions for elliptic polynomial cryptography with elliptic polynomial hopping as recited in claim 5, wherein the form of the elliptic polynomial equation is selected to be $$y^2 = \sum_{l \in S_{nx}} b_{1l}^{(s)} x_l^3 + \sum_{l,k \in S_{nx}, l \neq k} b_{2lk}^{(s)} x_l^2 x_k.$$

7. The method of generating hash functions for elliptic polynomial cryptography with elliptic polynomial hopping as recited in claim 6, wherein the step of embedding the 0-th block of the message bit string includes the steps of:

a) dividing the message bit string into (nx+ny+1) bit-strings $m_{x,0}, m_{x,1}, \ldots, m_{x,nx}, m_{y,1}, \ldots, m_{k,ny}$;

b) assigning the value of the bit string of $m_{x,0}, m_{x,1}, \ldots, m_{x,nx}$ to $x_{0,m}, x_{1,m}, \ldots, x_{nx,m}$;

c) computing $$T^{(s-1)} = \sum_{l \in S_{nx}} b_{1l} x_l^3 + \sum_{l,k \in S_{nx}, l \neq k} b_{2lk} x_l^2 x_k;$$

and d) performing a Legendre test to determine if T has a square root, wherein if T has a square root, then assigning the square root to $y_0$, and if T does not have a square root, then the x-coordinates and y-coordinates of the elliptic polynomial point with the embedded shared secret key bit string are selected as $gx_{i,m}$ and $$g^{\frac{3}{2}} y_{i,m},$$

respectively.

8. The method as recited in claim 7, wherein the step of hashing the hash point includes the steps of:

a) setting the x-coordinates of a hopped point $x_{0,o}^{(r)}, x_{1,o}^{(r)}, \ldots, x_{nx,o}^{(r)}$ to the x-coordinates $x_{0,o}^{(s)}, x_{1,o}^{(s)}, \ldots, x_{nx,o}^{(s)}$ of an original point $x_{i,o}^{(r)} = x_{i,o}^{(s)}$ for $i=0,\ldots,nx$;

b) substituting the value of the x-coordinates $x_{0,o}^{(r)}, x_{1,o}^{(r)}, \ldots, x_{nx,o}^{(r)}$ into a new elliptic polynomial equation to obtain $$T^{(r)} = \sum_{l \in S_{nx}} b_{1l}^{(r)} (x_l^{(r)})^3 + \sum_{l,k \in S_{nx}, l \neq k} b_{2lk}^{(r)} (x_l^{(r)})^2 x_k^{(r)},$$

wherein any value of $x_{0,o}^{(r)}, x_{1,o}^{(r)}, \ldots, x_{nx,o}^{(r)}$ leads to a value of; and c) if $T^{(r)}$ is quadratic residue, then setting $y_o^{(r)} = \sqrt{T^{(r)}}$ and the hopped point is given by $(x_{0,o}^{(r)}, x_{1,o}^{(r)}, \ldots, x_{nx,o}^{(r)}, y_o^{(r)})$, and if $T^{(r)}$ is non-quadratic residue, then setting $y_{0,o}^{(r)} = \sqrt{g^3 T^{(r)}}$, and the hopped point is given by $(gx_{0,o}^{(r)}, gx_{1,o}^{(r)}, \ldots, gx_{nx,o}^{(r)}, y_{0,o}^{(r)})$.

* * * * *